United States Patent
Orsini et al.

(10) Patent No.: US 10,870,555 B2
(45) Date of Patent: Dec. 22, 2020

(54) TAPE RULE ASSEMBLY WITH DIFFERENTIAL SPRING-DRIVE SYSTEMS

(71) Applicant: Stanley Black & Decker, Inc., New Britain, CT (US)

(72) Inventors: Antony Orsini, Oradell, NJ (US); Keith M. Lombardi, Avon, CT (US); Bruce Eidinger, Meriden, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 557 days.

(21) Appl. No.: 15/598,479

(22) Filed: May 18, 2017

(65) Prior Publication Data

US 2018/0334354 A1    Nov. 22, 2018

(51) Int. Cl.
| B65H 75/48 | (2006.01) |
| G01B 3/1041 | (2020.01) |
| G01B 3/1005 | (2020.01) |

(52) U.S. Cl.
CPC ......... *B65H 75/486* (2013.01); *G01B 3/1005* (2013.01); *G01B 3/1041* (2013.01); *B65H 2403/481* (2013.01); *G01B 2003/103* (2013.01); *G01B 2003/1023* (2013.01); *G01B 2003/1053* (2013.01)

(58) Field of Classification Search
CPC ............ B65H 75/486; B65H 2403/481; G01B 3/1005; G01B 3/1041; G01B 2003/103; G01B 2003/1023; G01B 2003/1053
See application file for complete search history.

(56) References Cited

U.S. PATENT DOCUMENTS

| 2,151,130 | A |   | 3/1939 | Salomon et al. |
| 2,586,386 | A |   | 2/1952 | Ryan |
| 2,824,374 | A | * | 2/1958 | Abrams ............... G01B 3/1041 33/763 |
| 2,904,282 | A |   | 9/1959 | Zelnick |
| 3,049,317 | A |   | 8/1962 | Kessler |
| 3,774,308 | A | * | 11/1973 | Jurentkuff ............ G01B 3/1084 33/493 |
| 4,186,490 | A | * | 2/1980 | Quenot ............... G01B 3/1005 33/762 |
| 4,402,472 | A |   | 9/1983 | Burtscher |
| 4,756,087 | A |   | 7/1988 | Sing |
| 5,624,085 | A |   | 4/1997 | Usami |
| 5,718,056 | A |   | 2/1998 | Miyasaka et al. |
| 5,820,057 | A |   | 10/1998 | Decarolis et al. |

(Continued)

FOREIGN PATENT DOCUMENTS

| DE | 10311105 A1 | 9/2004 |
| GB | 451086 A | 7/1936 |

OTHER PUBLICATIONS

Extended European Search Report dated Jun. 19, 2018.

*Primary Examiner* — Nimeshkumar D Patel
*Assistant Examiner* — Tania Courson
(74) *Attorney, Agent, or Firm* — Gabriel A. Haboubi

(57) ABSTRACT

A tape rule assembly includes differential spring-drive systems for rotating a reel of tape through an angular distance different from the angular distance traveled by a hub carrying a wound spring, relative to the tape rule housing. The differential spring drive systems include planetary and cycloidal drive systems. The tape rules of the present invention are thus made more compact than conventional tape rules.

10 Claims, 20 Drawing Sheets

(56) References Cited

U.S. PATENT DOCUMENTS

| | | | |
|---|---|---|---|
| 7,559,154 B2 | 7/2009 | Levine et al. | |
| 9,841,264 B2 * | 12/2017 | Kamani | G01B 3/1056 |
| 9,874,428 B1 * | 1/2018 | Nelson | H05K 999/99 |
| 10,023,406 B2 * | 7/2018 | Klubertanz | B65G 33/34 |
| 10,132,605 B2 | 11/2018 | Nelson et al. | |
| 10,422,616 B2 * | 9/2019 | Orsini | F16F 1/121 |
| 10,458,771 B2 | 10/2019 | Nelson et al. | |
| 2004/0035971 A1 | 2/2004 | Li | |
| 2013/0330222 A1 * | 12/2013 | Blechschmidt | G06F 30/00 |
| | | | 418/61.3 |
| 2015/0345607 A1 * | 12/2015 | Zheng | F16H 49/001 |
| | | | 475/165 |
| 2018/0273341 A1 | 9/2018 | Vitas et al. | |
| 2019/0011244 A1 * | 1/2019 | Orsini | F03G 1/02 |
| 2020/0011648 A1 | 1/2020 | Nelson et al. | |

\* cited by examiner

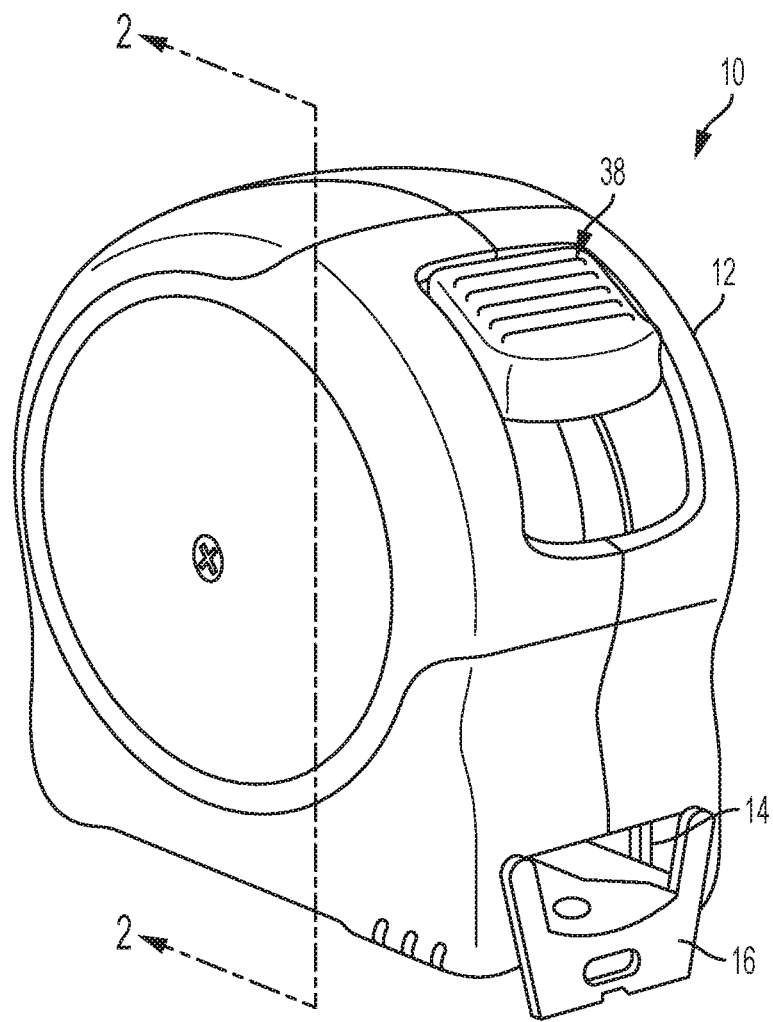
FIG. 1
(CONVENTIONAL)

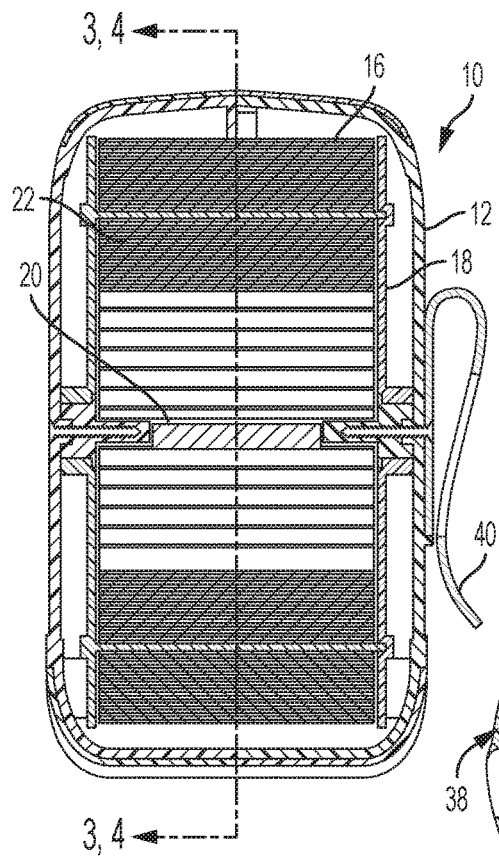
FIG. 2
(CONVENTIONAL)
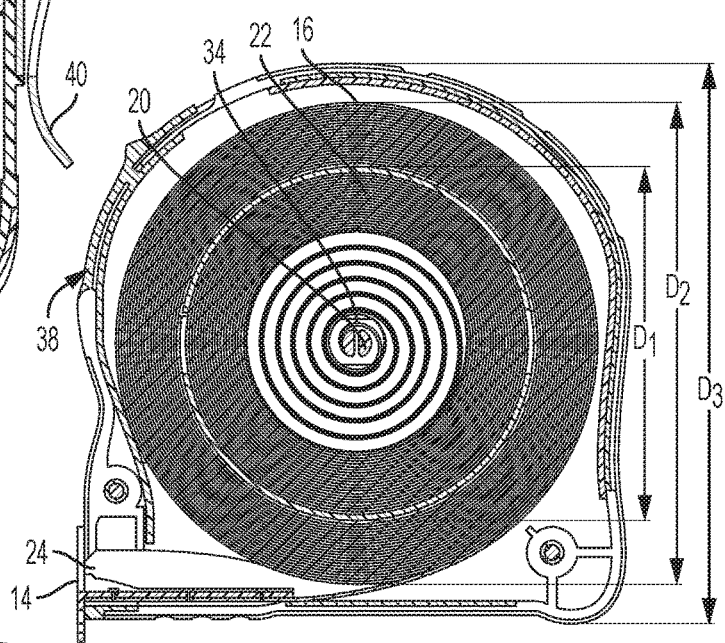
FIG. 3
(CONVENTIONAL)
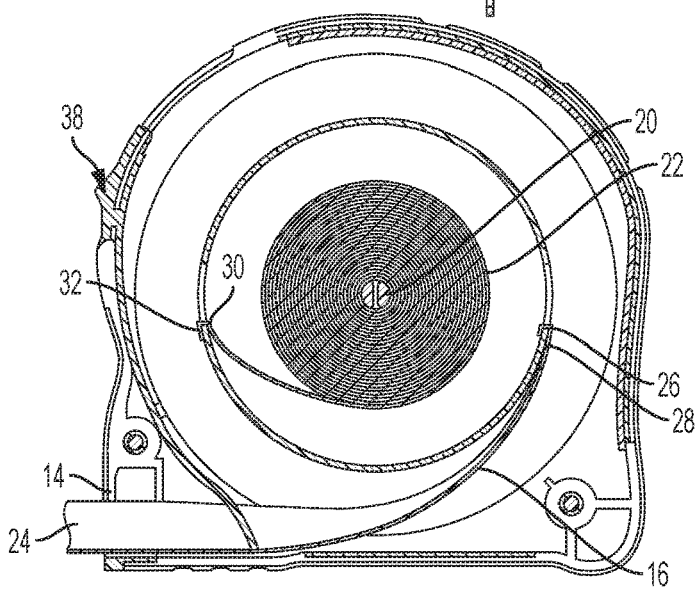
FIG. 4
(CONVENTIONAL)

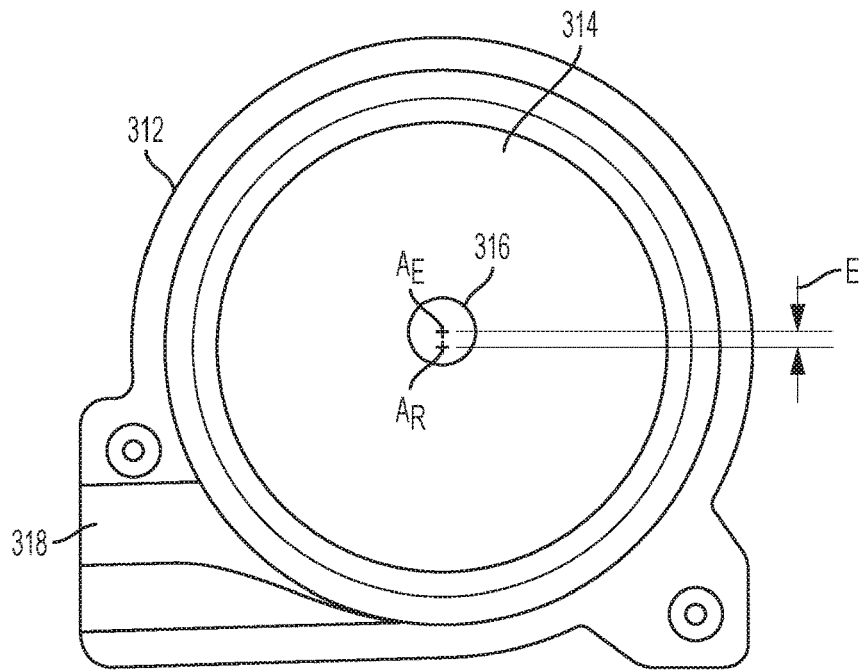
FIG. 19
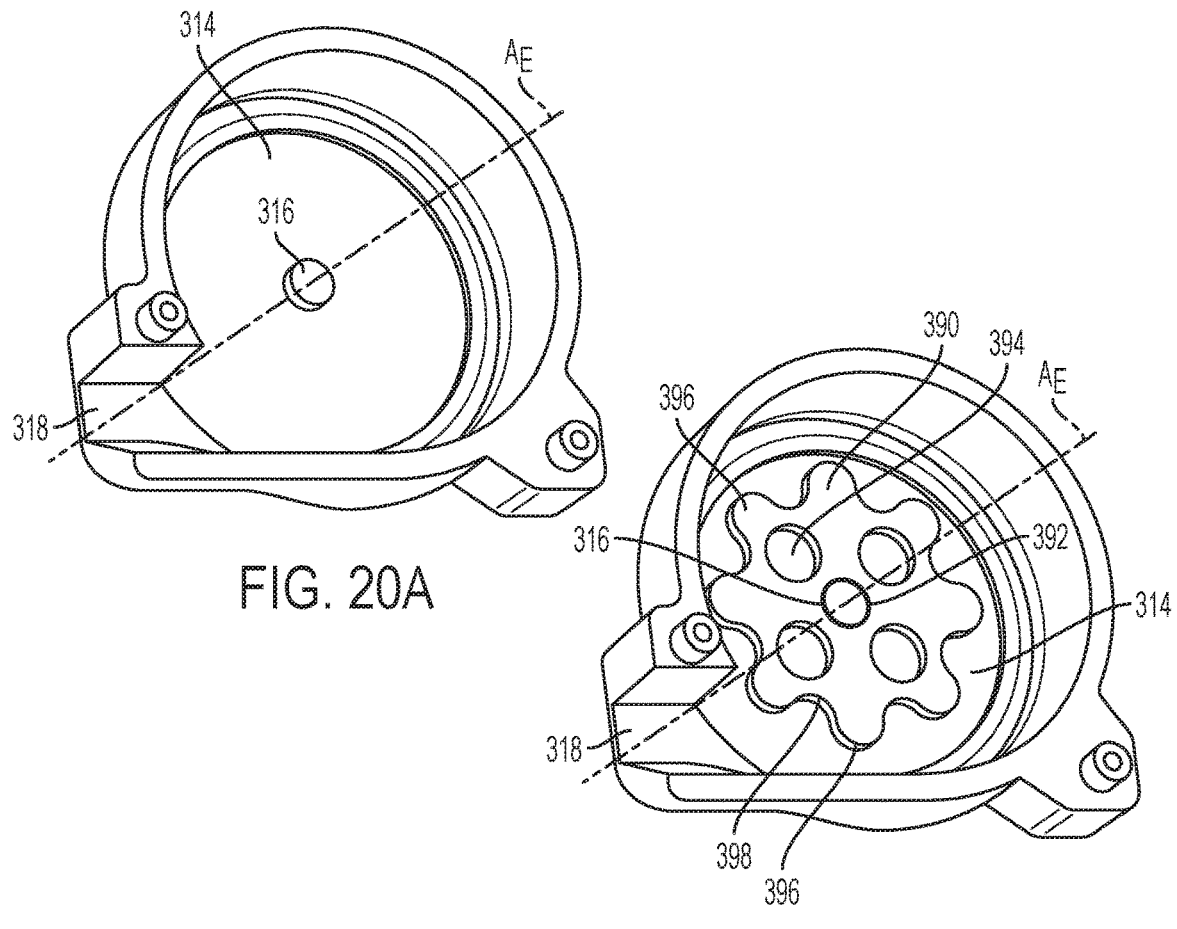
FIG. 20A
FIG. 20B

TAPE RULE ASSEMBLY WITH DIFFERENTIAL SPRING-DRIVE SYSTEMS

BACKGROUND OF THE INVENTION

1. Field of the Invention

The present invention relates to tape rules, and in particular to tape rules in which extending a length of tape from the tape rule housing tightens a coiled retraction spring, which then retracts the tape upon release by an operator.

2. Description of the Related Art

As used herein, the phrase "tape rule" or "tape measure" includes any mechanism for storing and extending a length of tape or the like, whether or not gradations or other indicia of length are marked on the tape. As used herein, "tape" includes tape, fabric, metal ("blade"), surveyor's tape, line, wire, chain, rope, and any other medium which may be wrapped around a spool or an axle.

Conventional tape rules typically wrap a length of tape around an outer spool or "reel" so that a length of tape is extendable through a tape exit formed in the tape rule housing. The reel is rotatably disposed in the housing concentrically about a non-rotatable inner spool or spindle ("hub"), around which is wrapped several coils of a retraction spring. Examples of such tape rules are shown in U.S. Pat. No. 6,643,947, issued Nov. 11, 2003 to Murray, and in U.S. Pat. No. 8,793,890, issued Aug. 5, 2014 to Delneo et al, the disclosures of which patents are hereby incorporated herein by reference in their entireties (hereinafter "References").

A conventional tape rule 10 is also illustrated in FIGS. 1-4 of the Drawings of the present Application. The tape rule 10 includes a housing 12 defining a tape exit 14. A length of tape 16 is wound around a reel 18, which is rotatably mounted on a hub 20, which is fixed relative to the housing 12. A coil spring 22 is disposed concentrically within the reel 18, about the hub 20. A free end 24 of the tape 16 extends outwardly from the housing 12 via the tape exit 14. Referring to FIG. 4, the other end 26 of the tape 16 is attached to the reel at 28. An outer end 30 of the coil spring 22 is attached to the reel 18 at 32. An inner end 34 of the coil spring 22 is attached to the hub at 36 (FIG. 3). Referring now to FIGS. 1, 3 and 4, a holding assembly (generally shown as 38) may be operated by the user to hold the tape 16 at a desired length of extension. As shown in FIG. 2, a belt hook 40 may also be provided.

In operation, as shown in FIGS. 3 and 4, when the user extends a length of tape 16, the reel 18 is rotated in one direction in the housing 12. This causes the coil of spring 22 to tighten, because the outer end 30 of the coil spring is attached to the reel 18. By comparing FIGS. 3 and 4, it can be seen that when the entire usable length of tape 16 is withdrawn from the housing 12, the coil spring 22 has been tightened to a much smaller diameter. When the operator releases the holding assembly 38, the tightened coil spring 22 now rotates the reel 18 in the opposite direction to retract the tape 16. Thus, for every revolution of the tape 16 and reel 18 about the non-rotatable spindle 20, a single revolution or tightening wrap of the spring 22 is also made on the spindle.

The sizes of conventional tape rule housings are determined by the relative sizes of their respective internal components. The key parameter for determining the size of the tape rule is ultimately the outer diameter $D_1$ of the untensioned coil spring 22, as shown in FIG. 3. The outer diameter D1 therefore determines the minimum outer diameter D2 that the full coil of blade or tape 16 may have, which in turn determines the minimum outer diameter or size D3 of the housing 12. In certain conventional tape rules, where the tape rule stores 25 feet of tape which is 1.25 inches wide, the outer diameter $D_1$ of the untensioned spring 22 ranges from about 1.70 inches to about 1.90 inches, and the outer diameter $D_2$ of the tape or blade ranges from about 2.43 inches to about 2.62 inches. This in turn requires that the outer diameters $D_3$ of their respective housings range from about 3.5 inches to about 3.7 inches. Various attempts have been made to reduce the outer diameter of the untensioned spring, many of which have involved the use of a differential spring-drive system, in which the coil spring is wrapped around a rotatable spindle or hub, which is then configured to rotate through a different angular distance than that traveled by the reel. In such systems, it was thus possible to enable a fewer number of wraps of the spring to be made around the hub for a particular length of tape stored in the housing or, in the alternative, to use the same length of spring to retract a much longer tape.

However, conventional differential spring-drive systems share a common disadvantage—they require the use of multiple axles, shafts or spindles that extend into the same enclosed housing space in which rotate the hub, reel and/or gears. A typical conventional differential spring-drive arrangement requires two or more concentric axles, shafts or spindles to support a complex array of speed reduction components. Furthermore, such conventional systems also require the use of separate, additional bearings or bushings, or even an auxiliary spindle, to rotatably support the reel and/or hub in the housing. These two factors block out a non-negligible amount of radial space in the housing. Consequently, a larger housing is required to accommodate the reel and hub.

What is needed, therefore, is a differential spring-drive system which does not require spindles, shafts or axles that extend into or even through the enclosed housing space in which rotate the hub and reel, and further, which do not require additional bearings or bushings, or auxiliary spindles, to rotatably support components such as the reel in the housing.

SUMMARY OF THE INVENTION

It has been discovered that by disposing an essentially self-contained differential spring-drive subassembly in an enclosed space of the housing for a tape rule assembly, the need for axles, shafts or spindles extending through the housing walls of the enclosed space can be eliminated, and the outer diameter of the untensioned retraction spring can be minimized accordingly. The hub itself defines a single, self-contained spindle. Therefore the hub requires no other spindles in the enclosed space, whether disposed concentrically with the single spindle, or as auxiliary stub spindles. It has also been discovered that by providing the annular side walls of a hub of a differential spring-drive subassembly with respective bearing surfaces, a reel can be rotatably journaled concentrically about the hub directly on the hub side walls. This feature eliminates the need for separate bearings and bushings, or, for that matter, additional spindles for the reel, and thus frees more radial space. Significantly, the cooperation of the single, self-contained hub spindle with the ability to journal the reel directly on the bearing surfaces of the hub side walls thus minimizes all of the radial distances from the axis of rotation to each successive element of the tape rule assembly. By contrast, in conventional differential spring-drive systems, the diameters of the successive extra spindles, bearings and bushings cascade into a cumulative loss of radial space available for the hub and reel. That is why the housings for such conventional systems must be made larger.

Accordingly, in one embodiment of a tape rule assembly embodying a differential spring-drive of the present invention, a housing defines an enclosed space. A differential spring-drive subassembly is rotatably disposed in the enclosed space and is operative to tighten the spring around a hub when the tape is extended from the housing. The hub defines a single, self-contained spindle; the enclosed space is uninterrupted by any other spindle (as used herein, the term "spindle" includes for example elongated objects such as spindles, shafts, axles, or the like).

In another embodiment, the hub and reel are formed of plastic. One or more surfaces of the hub (such as the annular hub side walls) include a bearing surface, and the reel is disposed concentrically around the hub such that a surface of the reel is rotatably journaled directly on the hub bearing surfaces.

In still another embodiment, the differential spring-drive subassembly includes a planetary drive system.

In yet another embodiment, the housing includes two opposing side walls. A sun gear is fixedly connected to at least one of the opposing side walls and is operatively associated with the reel and the hub. At least one planet gear is rotatably supported on the hub, and the reel includes an internal ring gear. The internal ring gear and the at least one planet gear are aligned with the sun gear such that when the tape is extended from the tape exit, the consequent rotation of the reel causes the hub to rotate.

In a further embodiment, which includes a plurality of sun gears, internal ring gears and planet gears, the sun gears, internal ring gears and planet gears are configured so that when the reel rotates through four revolutions, the hub rotates through three revolutions, thereby causing only three wraps of spring to be tightened around the hub for the four revolutions of the reel, and thus reducing the outer diameter of an untensioned spring needed to produce a predetermined number of revolutions of the reel.

In another embodiment, a cylindrical member defining an internal ring gear is disposed concentrically between the hub and the reel, which itself defines a sun gear axially aligned with the axis of rotation of the differential spring-drive subassembly. The hub is rotatably disposed within the reel and is also rotatably connected to the housing; and at least one planet gear is rotatably supported on the hub. In a further embodiment, the cylindrical member is fixed relative to the housing. In both such embodiments, the sun gear, the at least one planet gear, and the internal ring gear are aligned with one another so that when the tape is extended from the housing, the consequent rotation of the reel causes the hub to rotate.

In still another embodiment, the differential spring-drive subassembly includes a cycloidal drive system.

In another embodiment, the reel of a cycloidal differential spring-drive subassembly is operatively associated with the housing and the hub so that when tape is extended from the tape exit, the reel rotates through a smaller angular distance than does the hub.

In a further embodiment, a method of minimizing the diameter of a coil spring disposed around the hub of a tape rule assembly includes creating an enclosed space within the housing uninterrupted by a spindle, and rotatably disposing one of a planetary and a cycloidal differential spring-drive system within the closed space, such that rotating a reel of a respective differential drive system through a first angular distance causes the hub of the respective differential drive system to rotate through a second angular distance different from the first angular distance.

In short, the differential spring-drive systems of the present invention yield tape rule assemblies which are more compact than conventional tape rule systems.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this Specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein, "connected" or "attached" includes physically or electrically attached, whether directly or indirectly, fixedly or adjustably mounted, as, for example, "a plurality of sun gears is operatively connected to a hub." Thus, unless otherwise specified, "connected" or "attached" is intended to embrace any operationally functional connection.

As used herein, "substantially," "generally," "slightly" and other words of degree are relative modifiers intended to indicate permissible variation from the characteristic so modified. It is not intended to be limited to the absolute value or characteristic which it modifies, but rather possessing more of the physical or functional characteristic than its opposite, and approaching or approximating such a physical or functional characteristic.

In the following description, reference is made to the accompanying Drawings, which are provided for illustration purposes as representative of specific exemplary embodiments in which the invention may be practiced. Given the following description of the Specification and Drawings, the apparatus and methods should become evident to a person of ordinary skill in the art. Further areas of applicability of the present teachings will become apparent from the description provided herein. It is to be understood that other embodiments can be utilized, and that structural changes based on presently known structural and/or functional equivalents can be made, without departing from the spirit or scope of the invention.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying Drawings, wherein:

FIG. 1 is a perspective view of a conventional tape rule assembly.

FIG. 2 is an elevational sectional view taken along lines 2-2 of FIG. 1.

FIG. 3 is an elevational sectional view taken along lines 3-3 of FIG. 2, in which a full length of tape is wrapped around a reel, and the spring is untensioned.

FIG. 4 is the same as FIG. 3, but illustrating the state when the tape has been fully withdrawn from the tape rule, and the spring has consequently been completely tightened on a spindle.

FIG. 19 is an elevational detail view of a housing member of the tape rule assembly shown in FIG. 16, illustrating the eccentricity of the axis of an annular member formed on the interior of the housing member, relative to an axis of rotation.

FIGS. 20A-20E are perspective detail views, with portions omitted for clarity, of progressively stacked elements of the tape rule assembly of FIG. 16.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION OF THE INVENTION

Figure 5:
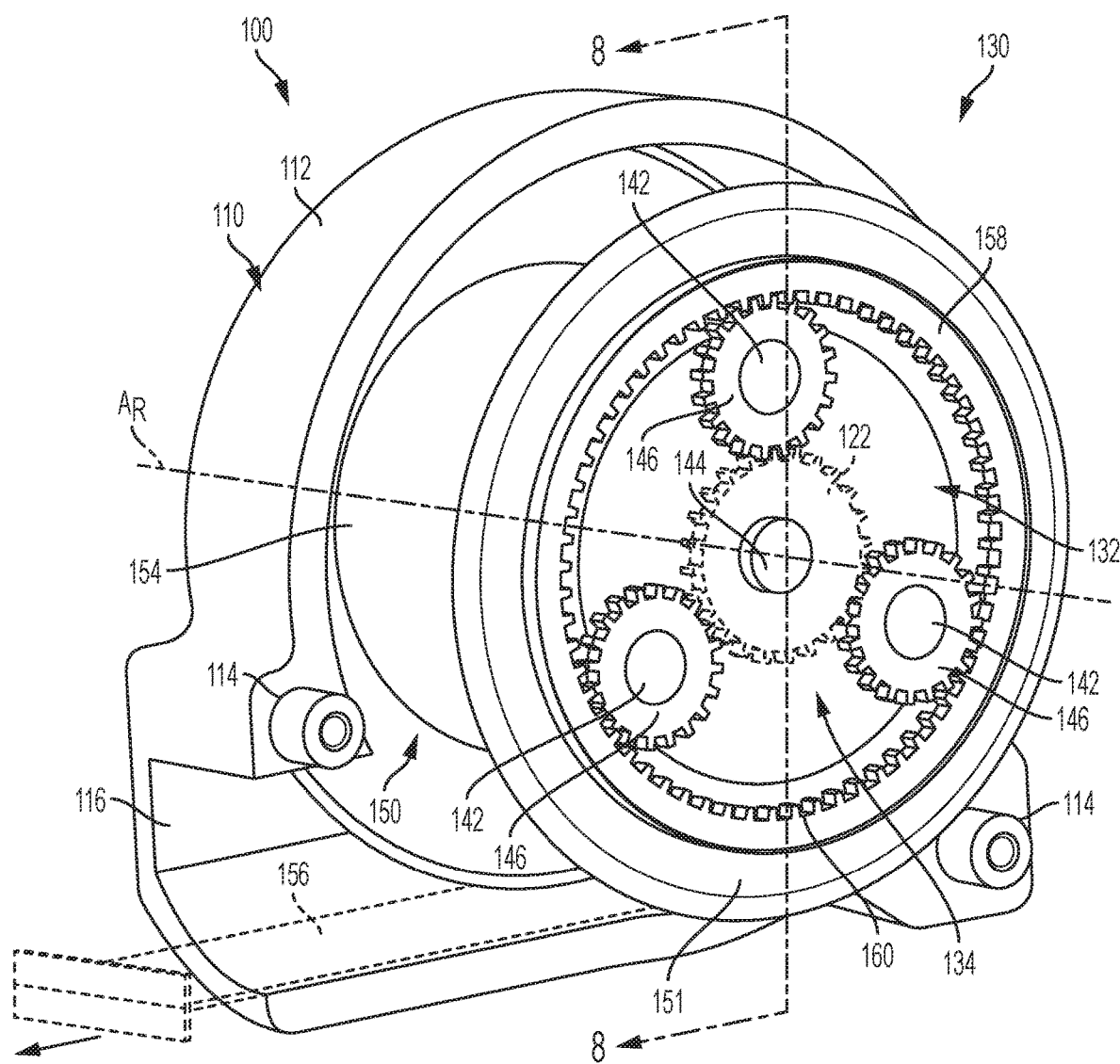
FIG. 5 is a perspective view of the tape rule assembly of the present invention, with one of the housing members removed for clarity, and with the sun gear (part of a housing member) shown in phantom.
Figure 6:
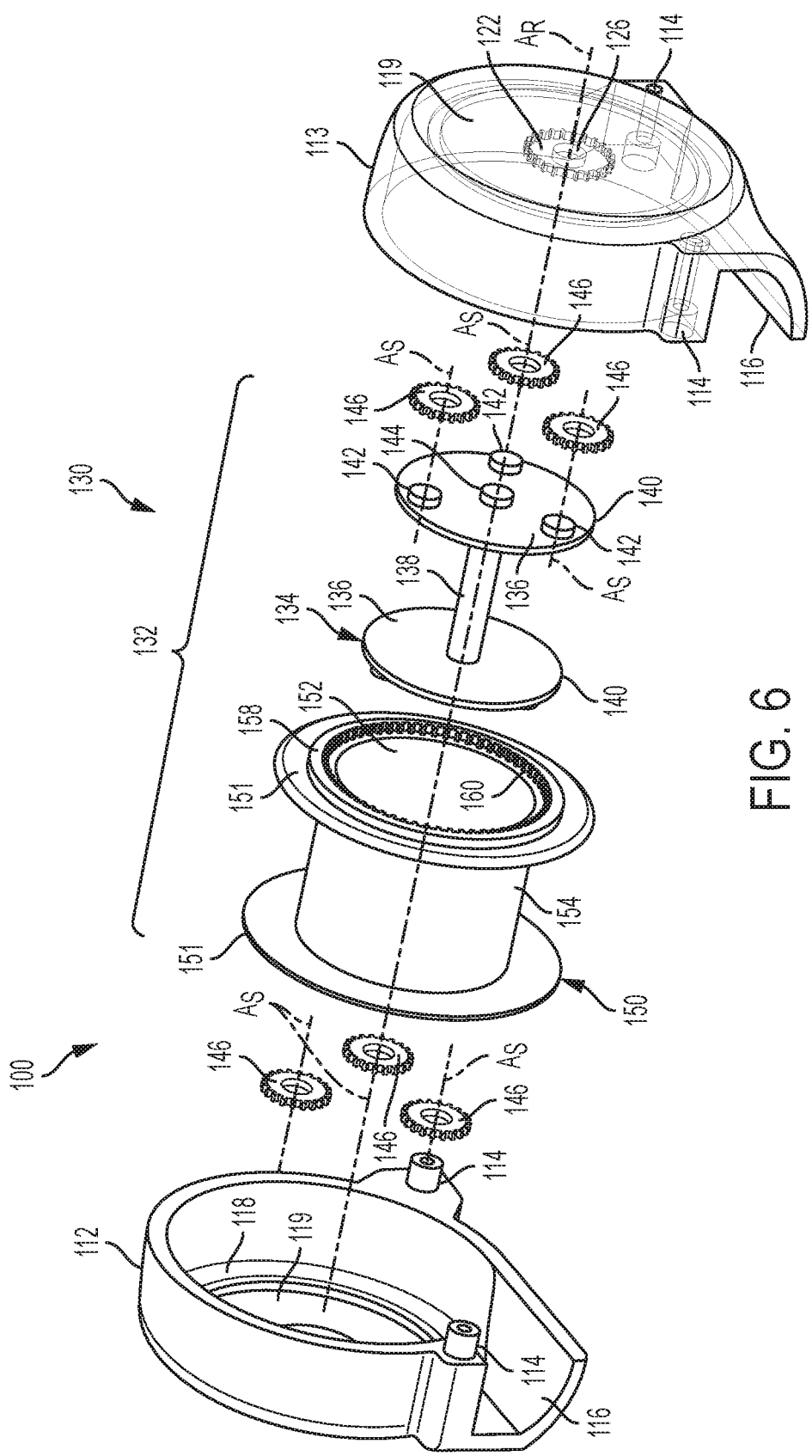
FIG. 6 is an exploded perspective view of the tape rule assembly of FIG. 5.
Figure 7A:
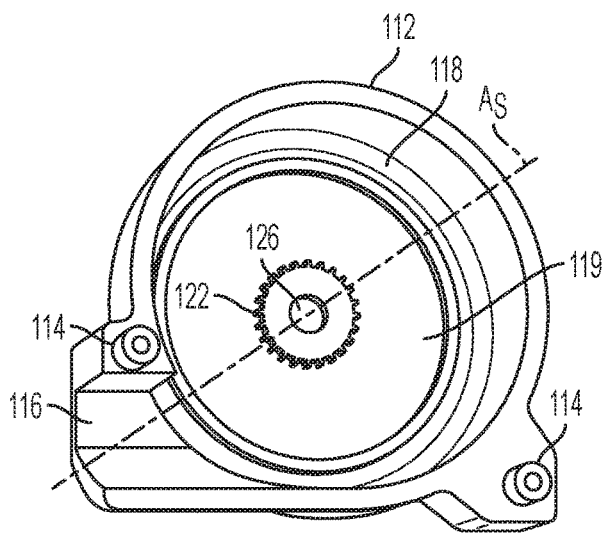
FIGS. 7A-7E are perspective detail views, with portions omitted for clarity, of progressively stacked elements of the tape rule assembly of FIG. 5.
Figure 7B:
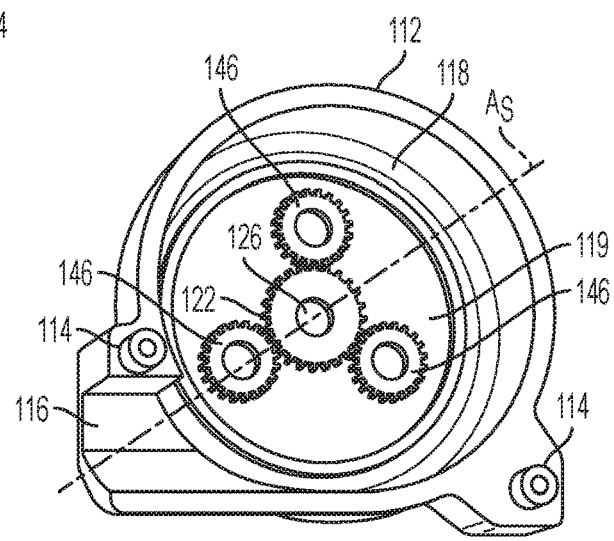
Figure 7C:
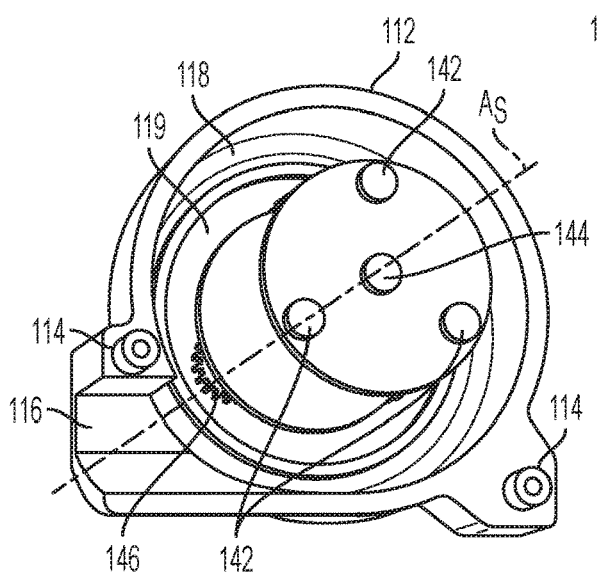
Figure 7D:
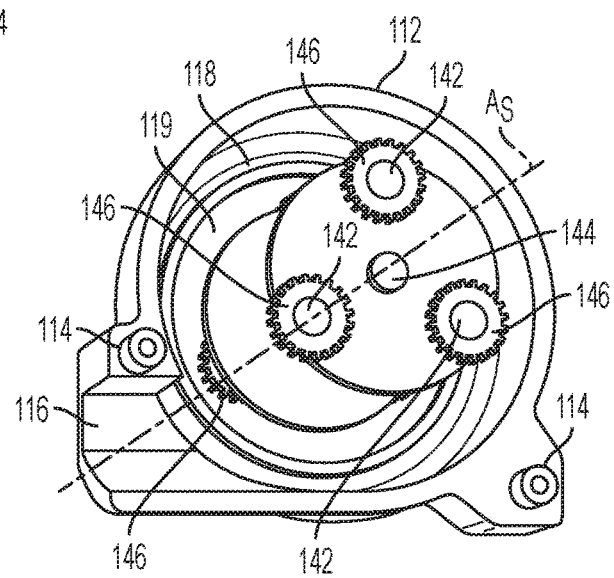
Figure 7E:
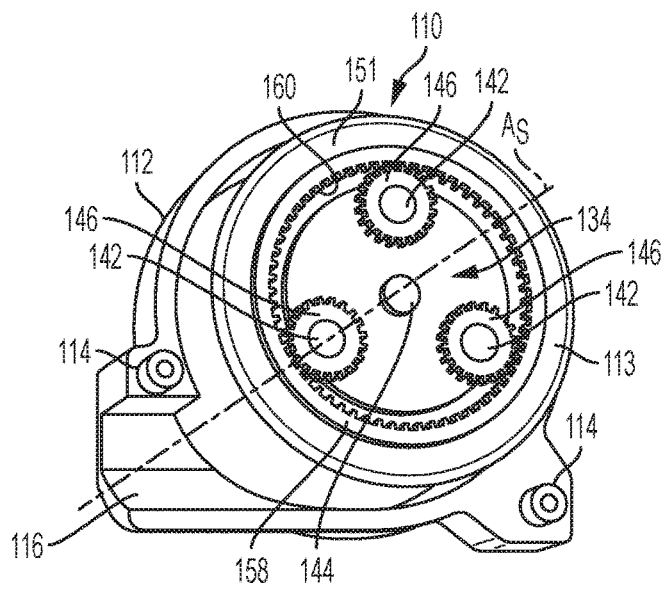

Apparatuses, systems, and methods embodying features, principles, and concepts of various exemplary embodiments of a tape rule assembly of the present invention will be described with reference to the Drawings. Referring to FIGS. 5-10D, an embodiment of the tape rule system is shown generally as 100. As shown in FIGS. 5-7E, the tape rule system 100 includes a housing 110 which is formed by first and second housing members 112, 113, which are joined together via cooperating fastener bosses 114 to define a tape exit 116.

Referring now to FIGS. 7A-7E and FIG. 8, each housing member 112, 113 includes matching annular rims 118 and housing side walls 119. When the housing members 112, 113 are connected to form the housing 110, they define an enclosed space 120, which is uninterrupted by a spindle (as previously noted, the term "spindle", as used herein, includes a spindle, shaft, axle, or other elongated object). A sun gear 122 having a sun gear axis $A_S$ may be fixedly attached to each housing side wall 119. In other embodiments, the sun gear 122 may be integrally molded into each housing side wall 119, or may be fixedly attached as a separate member to each side wall 119. The sun gear 122 and the annular rim 118 define a radial clearance space 124. The sun gear 122 itself defines an annular recess 126 centered on the sun gear axis $A_S$.

As shown in FIGS. 5-9, a differential spring-drive subassembly 130 may include a planetary drive system 132. The planetary drive system 132 includes a hub 134 rotatably disposed in the housing 110 about an axis of rotation $A_R$ coincident with the sun gear axis $A_S$. The hub 134 includes two annular side walls 136 separated by a single, self-contained hub spindle 138. One or more exterior surfaces of the hub 134 (such as the annular side walls 136) may also include one or more bearing surfaces 140. The hub annular side walls 136 include a plurality of axially-extending planet gear annular support members 142 defining planet gear axes 143. Each hub side wall 136 may include three equally-circumferentially-spaced planet gear support members 142, but it can be appreciated that, in other embodiments, the number of planet gear support members may vary depending upon the desired parameters to be achieved by a particular planetary drive system 132. For purposes of clarity, a coiled length of return spring 148 wrapped around the hub 134 is shown only in FIG. 9.

In an embodiment in which the tape rule assembly 100 carries a 25-foot, 50 ga. steel blade 156 coated with MYLAR® plastic, and which is 1.25 inches wide, the spring 148 may be formed of spring steel, may have a length of about 80 to 100 inches, and may have a thickness of from about 0.0051 inch to about 0.0065 inch, depending upon the desired ratio of the amount of angular rotation of the reel 150 relative to the angular rotation of the hub 134, as the blade is withdrawn from the tape rule assembly. This ratio will be described in greater detail below. It will be appreciated that in other embodiments, the blade or tape 156 may be longer or shorter, and have different widths, which may necessitate the use of return springs having different thicknesses to provide different strengths.

Figure 8:
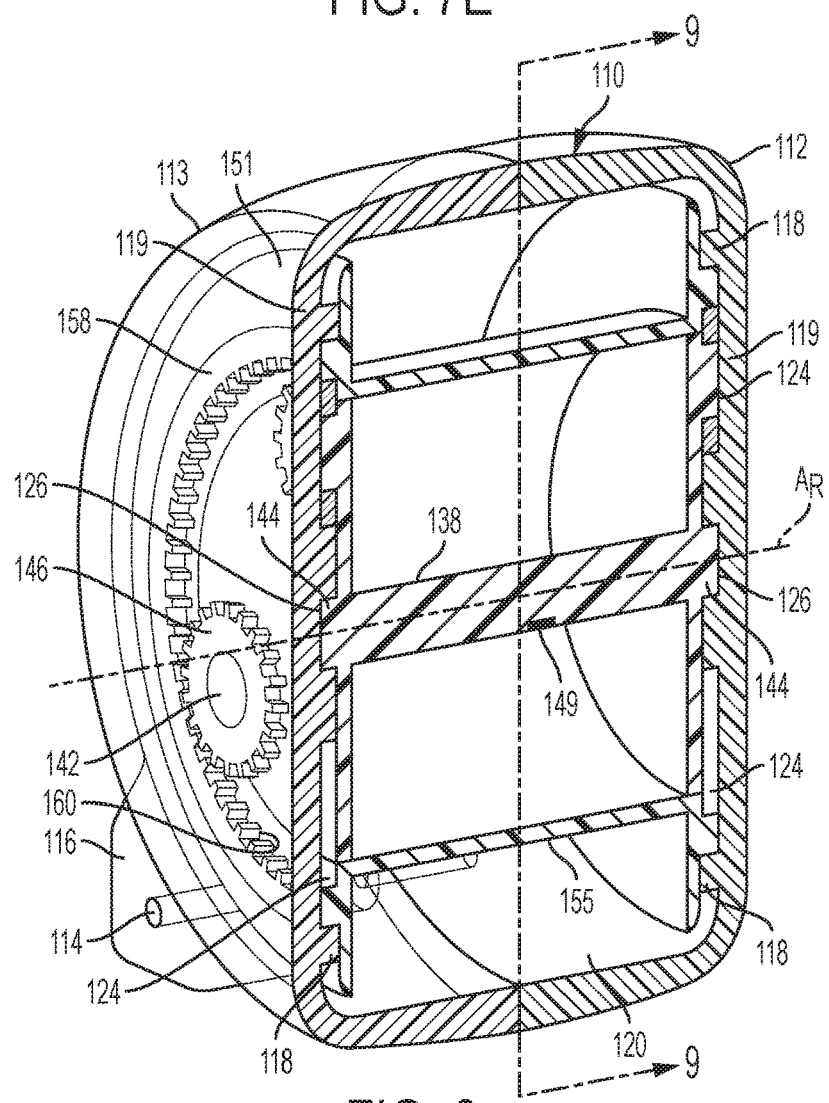
FIG. 8 is an elevational perspective sectional view taken along lines 8-8 of FIG. 5.

An annular hub support member 144 also extends axially outwardly from each hub side wall 136 and is configured to be journaled within the sun gear central annular recess 126 formed on each housing side wall 119, as shown for example in FIG. 8. The annular hub support members 144 are axially aligned along the axis of rotation $A_R$. A plurality of planet gears 146 are rotatably disposed circumferentially equidistantly on respective planet gear annular support members 142.

Referring again to FIGS. 5-8, a reel 150 having two axial ends 151 is rotatably journaled directly on the one or more hub bearing surfaces 140 and is disposed concentrically around the hub 134. The reel 150 includes an inner cylindrical surface 152 which rotatably engages the hub bearing surfaces 140, and an outer cylindrical surface 154, which supports a wound length of tape or blade 156 (shown in phantom in FIG. 5, and schematically in FIG. 9 and FIGS. 10A-10D). The reel 150 further includes a ring 158 disposed adjacent each axial end 151 which defines an internal ring gear 160. As shown in FIG. 8, the housing clearance space 124 accommodates the sun gears 146 and the reel ring 158. Also as shown in FIGS. 5 and 8, the sun gear 122, planet gears 146 and internal ring gear 160 are configured to cooperate so that when a length of tape is withdrawn from the tape rule assembly 110, as shown in FIG. 5, the reel 150 and therefore the internal ring gear are rotated clockwise with respect to the position of the housing 110 shown in FIG. 5.

Therefore, by journaling the reel 150 directly on the hub 134, the need for bearings, bushings or auxiliary spindles for the reel is completely eliminated. Furthermore, this feature cooperates with the hub's self-contained single spindle 138 to successively minimize the radial distances from the axis of rotation $A_R$ to each of the other elements of the tape rule system 100. This may be contrasted with conventional systems, in which the radial sizes of multiple spindles, bearings and bushings cascade at each radial layer of the mechanism, ultimately to produce a cumulative adder to the outer diameter of the tape rule.

The innermost end of blade or tape 156 may be attached to outer cylindrical surface 154 of reel 150 at 155, as shown schematically in FIG. 8. The free end of the spring 148 may also be attached to the outer cylindrical surface 154, at 155, so that rotation of the reel 150 tightens the spring. The innermost end of the spring 148 may be attached to the hub spindle 138 at 149, as is also shown schematically in FIG. 8. Various methods for attaching the blade and spring to components of a tape rule are well known in the art, and may also be found in the References.

Figure 9:
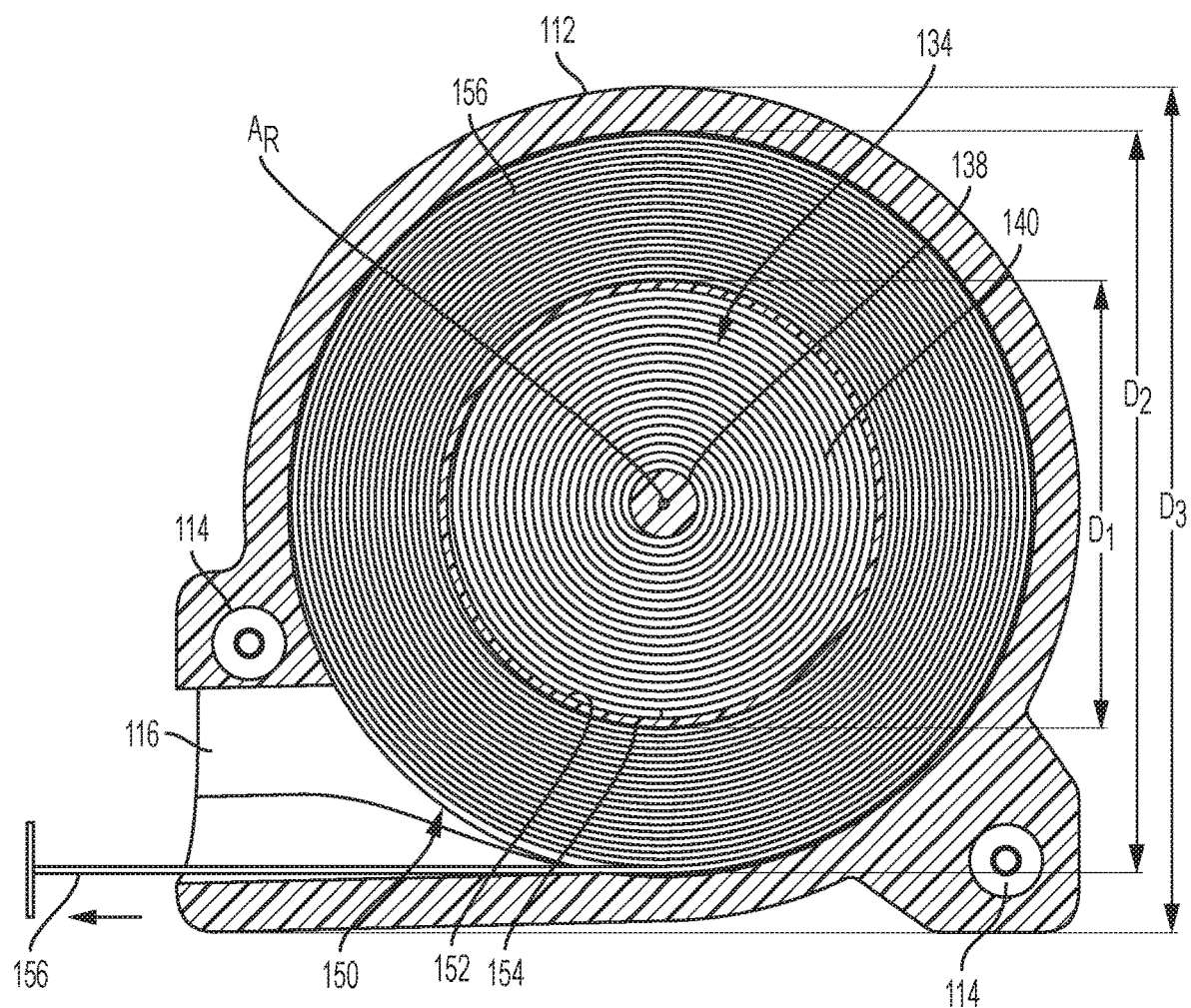
FIG. 9 is an enlarged schematic elevational sectional view taken along lines 9-9 of FIG. 8.
Figure 10A:
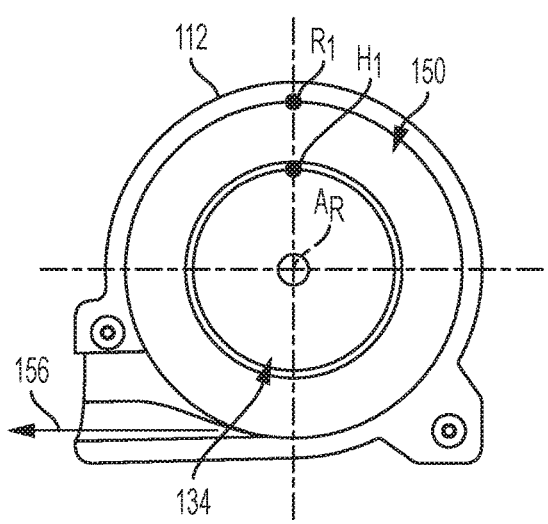
FIGS. 10A-10D are schematic elevational sectional views, similar to that of FIG. 9, showing the relative positions of points on the reel and the hub, as tape is withdrawn from the tape rule assembly of FIG. 5.
Figure 10B:
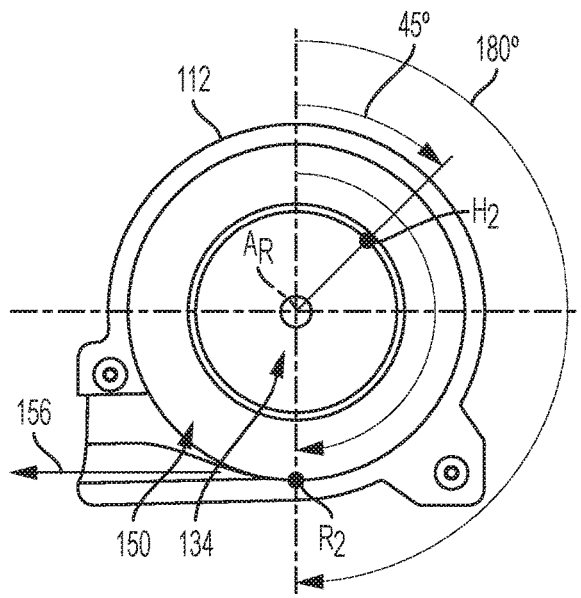
Figure 10C:
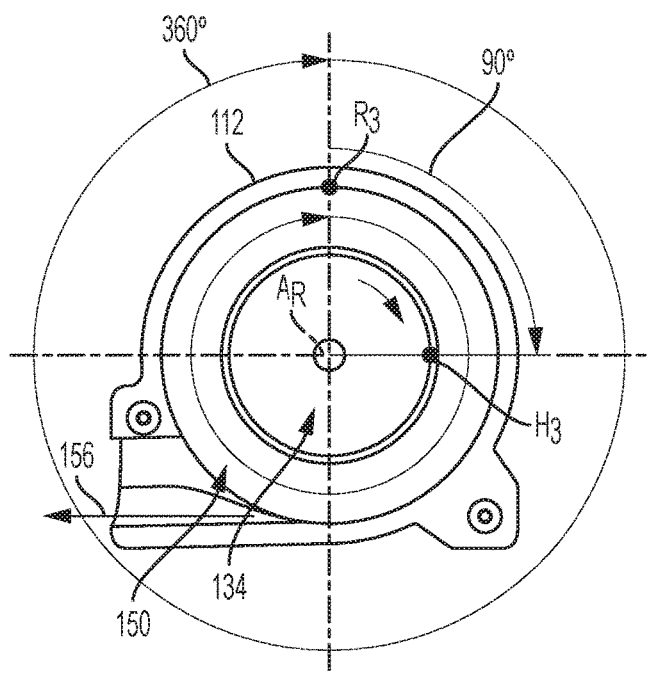
Figure 10D:
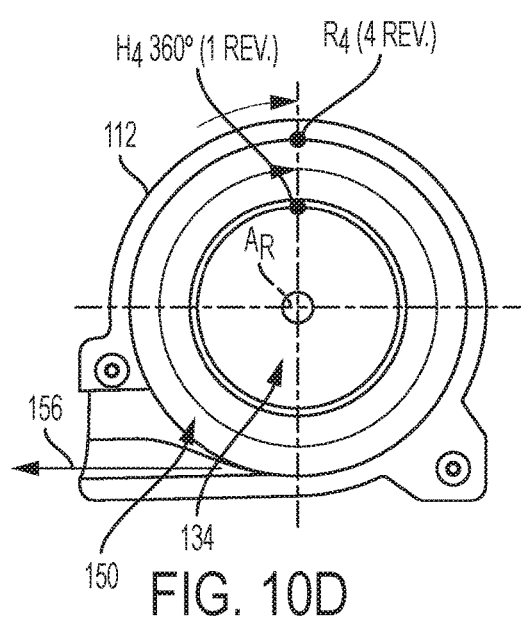

In operation, inasmuch as the sun gear 122 is fixed relative to the housing 110, when the reel 150 and therefore the internal ring gear 160 rotates clockwise, the planet gears 146 force the hub 134 to rotate clockwise relative to the housing 110, as well. As shown in FIGS. 10A-10D, the various elements of the planetary drive system 132 may be selected so that, for each 360° revolution of a point R on the reel 150 caused when a length of tape or blade 156 is withdrawn from the tape exit 116 (as shown by the arrow), a point H on the hub 134 rotates 90°. FIGS. 10A-10D also show that the point R rotates from position $R_1$ through position $R_4$, as the point H rotates from position $H_1$ through position $H_4$. Ultimately, for this embodiment, for every four revolutions of the reel 150, the hub 134 makes one complete revolution. Consequently, as the tape or blade 156 is extended from the reel 150, the four rotations of the reel will cause the spring 148 to be wrapped three times around the hub 134, creating a differential drive ratio of 4/3. Thus, only ¾ of the length of spring 148 normally required to retract a length of tape 156 is needed to do so in this embodiment. Accordingly, as shown in FIG. 9, the outer diameter $D_1$ of the untensioned spring 148 can be made considerably smaller than that required for conventional tape rules. As a result, for a consequent reduced outer diameter $D_1$ of the spring 148 of about 1.59 inches, the outer diameter $D_2$ of the blade 156 can be reduced to about 2.52 inches, and the outer diameter of the housing $D_3$ 110 can be reduced to about 3.125 inches.

The tape rule assembly 100 using the planetary drive system 132 thus results in a tape rule which is much more compact than conventional tape rules. In this respect, other embodiments of the planetary drive system 132 may be configured so that the ring gears, planet gears and sun gears may have different amounts of gear teeth, different spacing relative to one another and to the housing 110, be disposed in different locations relative to the housing 110 in the tape rule assembly 100, and yield different differential drive ratios. Other embodiments may further hold different elements of the planetary drive system 132 stationary relative to the housing 110, rather than the sun gear 122, and may cause the various elements of the planetary drive system to rotate in different directions. Finally, the spring 148 and/or tape or blade 156 may be wound in different directions to achieve a desired result. Although, in the embodiments discussed above, the reel 150 rotates through an angular distance which is different from the angular distance traveled by the hub 134 as a consequence of the tape or blade 156 being extended from the tape exit 116, in other embodiments, the reel and hub may rotate through the same angular distance.

The housing, reel, hub and gears may be formed of plastic, such as High Impact ABS. However, in other embodiments, such components can be formed of any suitable materials, as long as the operation of the differential spring-drive subassembly 130 achieves substantially the same results.

FIGS. 11-15 illustrate another embodiment 200 of a tape rule assembly according to the present invention. As shown schematically in FIG. 11, the tape rule assembly 200 includes a housing 210, which may be similar to the housing 110 of the tape rule assembly 100. The housing 210 defines an enclosed space 220, which is uninterrupted by a spindle and in which is disposed a differential spring-drive subassembly 230. The differential spring-drive subassembly 230 may include a planetary drive system 240, which may be similar to the planetary drive system 132 of the tape rule assembly 100. In this embodiment, the differential spring-drive subassembly 230 is cantilever-mounted to a housing side wall 211. In other embodiments, the spring-drive subassembly 230 may be supported by both side walls 211 of the housing 210.

The planetary drive system 240 includes a hub 250 rotatably supporting a plurality of planet gears 260 and concentrically disposed in a reel 270 about an axis of rotation $A_R$. The planetary drive system 240 also includes a cylindrical member 280 concentrically disposed between the hub 250 and the reel 270 about the axis of rotation $A_R$.

Figure 11:
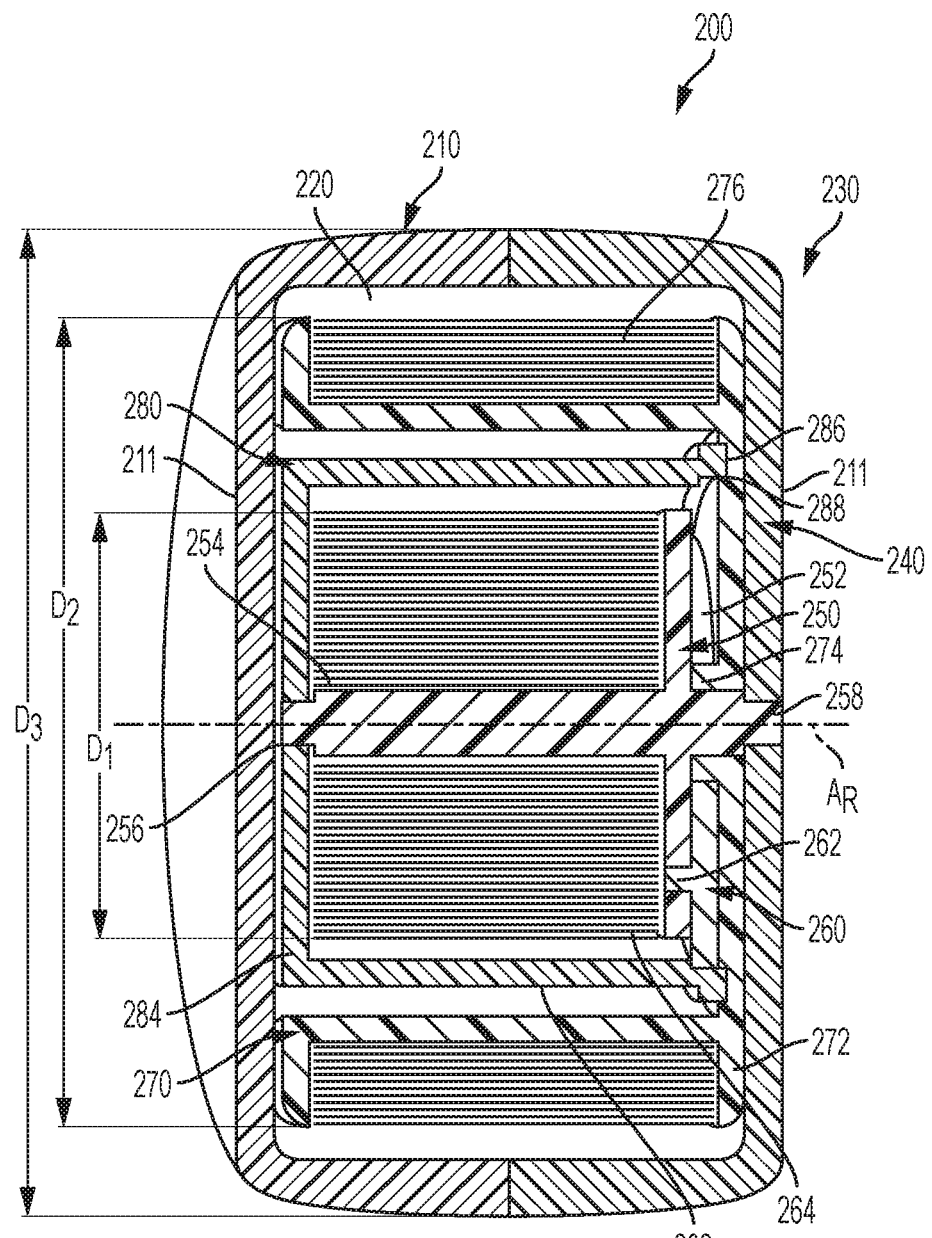
FIG. 11 is a schematic elevational sectional perspective view of another embodiment of the tape rule assembly of the present invention.
Figure 12:
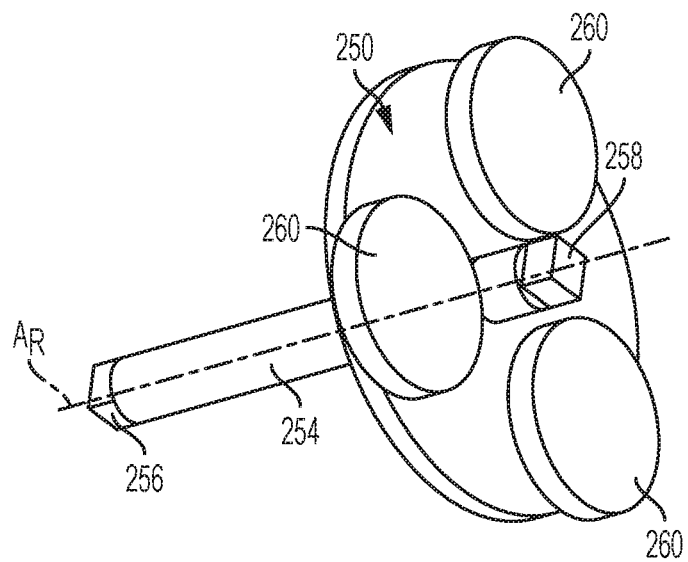
FIG. 12 is a schematic perspective detail view, taken from one direction, of a hub and attached planet gears subassembly of the tape rule assembly shown in FIG. 11.
Figure 13:
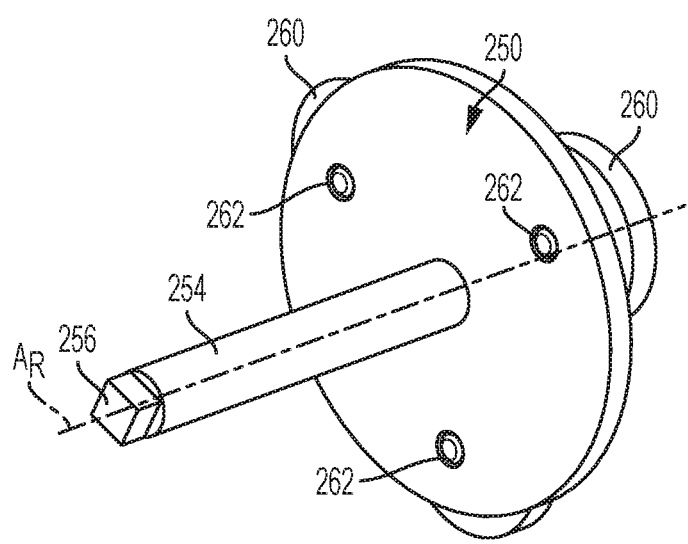
FIG. 13 is a view similar to that of FIG. 12, but taken from the opposite direction.

As shown in FIGS. 12 and 13, hub 250 includes a side wall 252 connected to a single, self-contained hub spindle 254. The side wall 252 and the hub spindle 254 may be formed in one piece; in other embodiments, the side wall 252 and the hub spindle 254 may be formed as separate elements. The hub spindle 254 includes two ends, namely a hub spindle housing end 256 and a hub spindle reel end 258. Referring now to FIG. 11, the single hub spindle 254 may be rotatable relative to the housing 210, in which case the hub spindle housing end 256 and the hub spindle reel end 258 may have annular cross-sections. In this embodiment, the cylindrical member 280 may be held stationary relative to the housing 210. In another embodiment, the cylindrical member 280 may be rotatable relative to the housing 210, while the hub spindle 254 may be held stationary. In the latter embodiment, the hub spindle housing end 256 and the hub spindle reel end 258 may have square or rectangular cross-sections, as shown in FIGS. 12 and 13. Referring again to FIG. 11, the planet gears 260 are rotatably supported on planet spindles 262 extending axially outwardly from the side wall 252 of the hub 250. In this embodiment, three planet gears are spaced circumferentially equidistantly on the hub side wall 252, but in other embodiments, fewer or greater numbers of planet gears may be used. A return spring 264 is wound about the hub spindle 254 and is connected to the hub spindle and the cylindrical member 280 in a fashion similar to that discussed above with respect to the planetary drive system 132.

Figure 15:
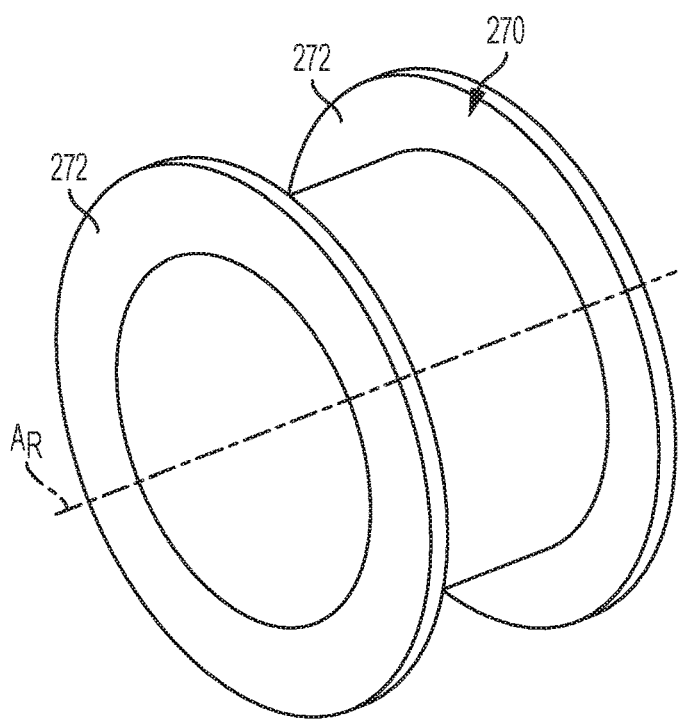
FIG. 15 is a schematic perspective detail view of the reel of the tape rule assembly shown in FIG. 11.
Figure 16:
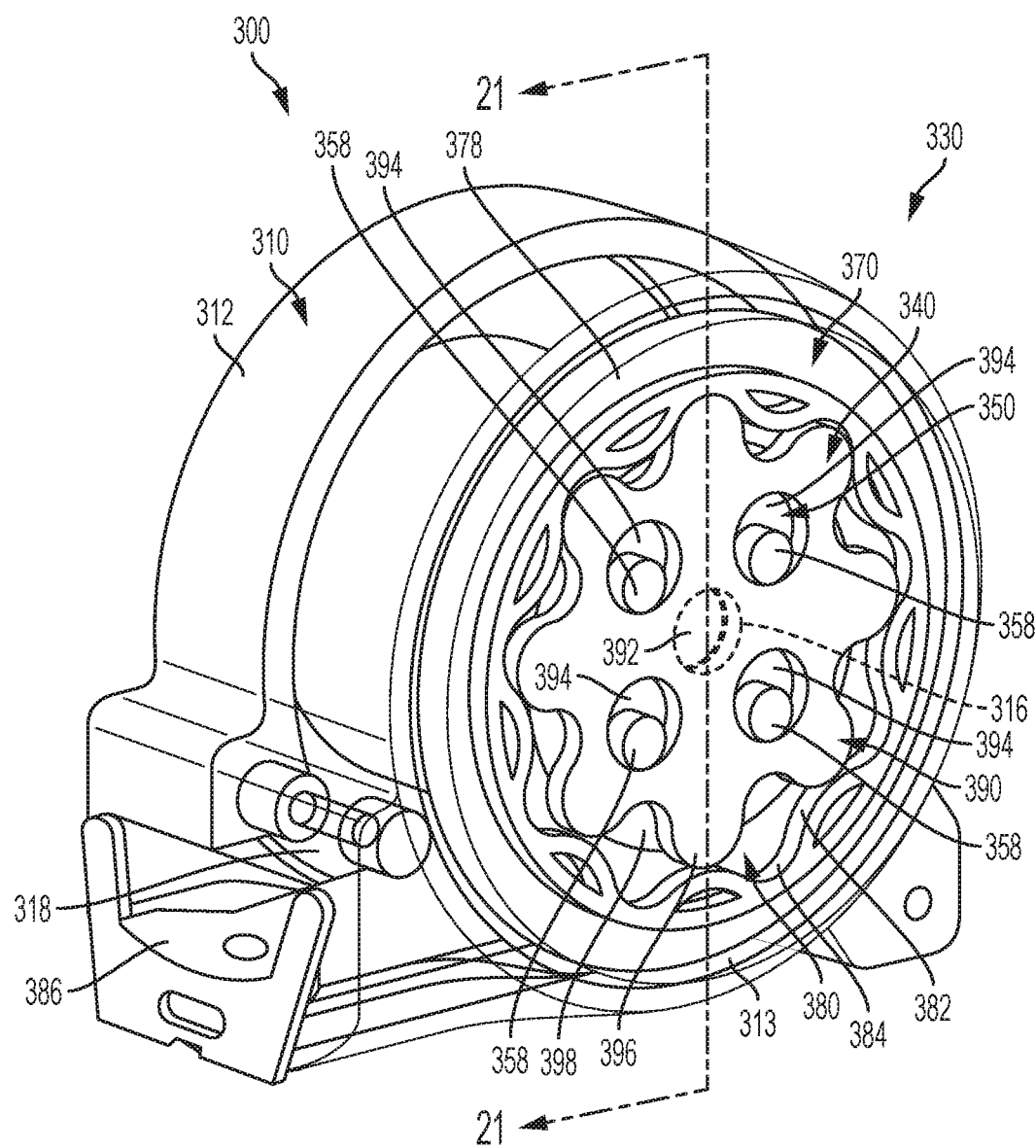
FIG. 16 is a perspective view of still another embodiment of the tape rule assembly of the present invention, with one of the housing members removed for clarity, and with an annular gear support member (part of a housing member) shown in phantom.
Figure 17A:
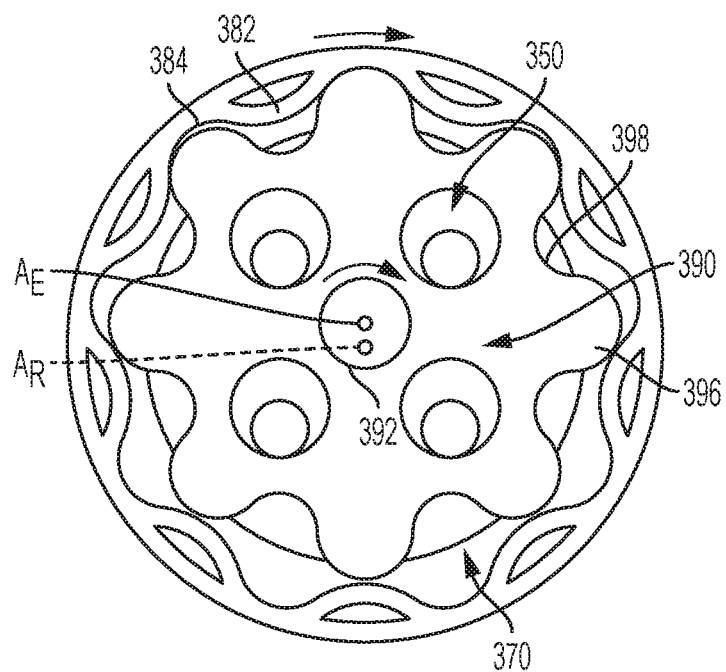
FIGS. 17A-17D are progressive schematic elevational detail views of the cycloidal operation of the tape rule assembly of FIG. 16.
Figure 17B:
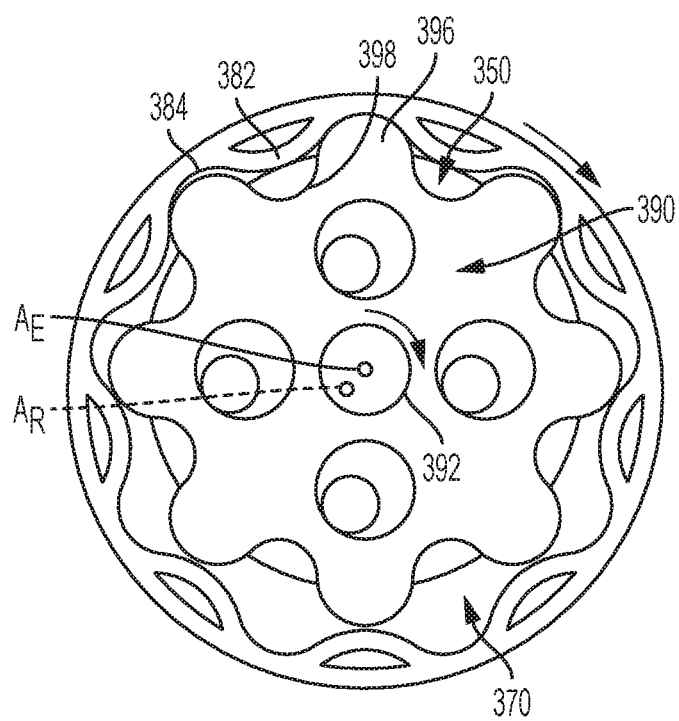
Figure 17C:
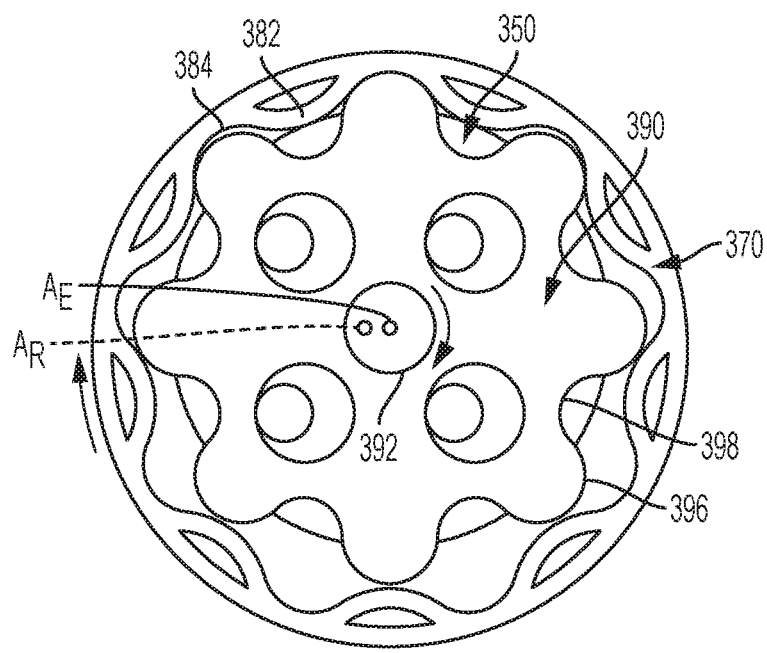
Figure 17D:
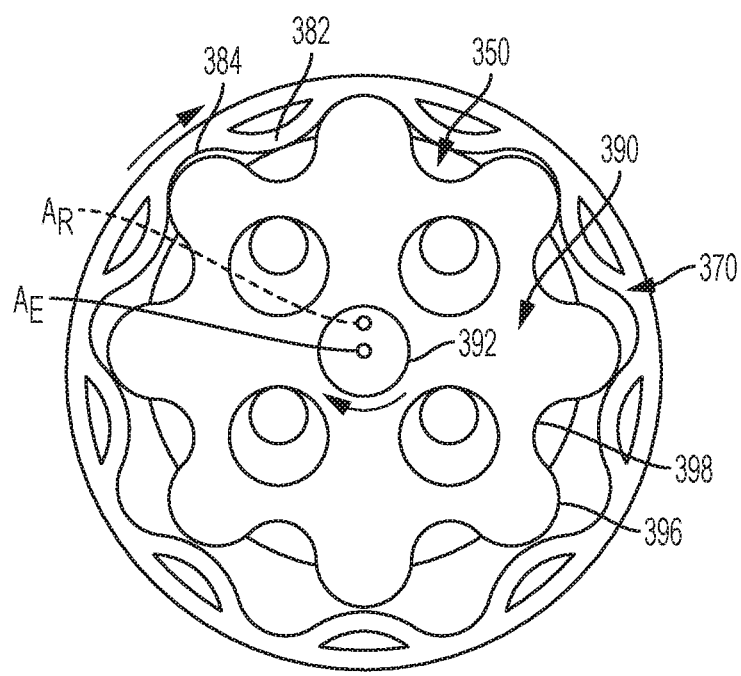
Figure 18:
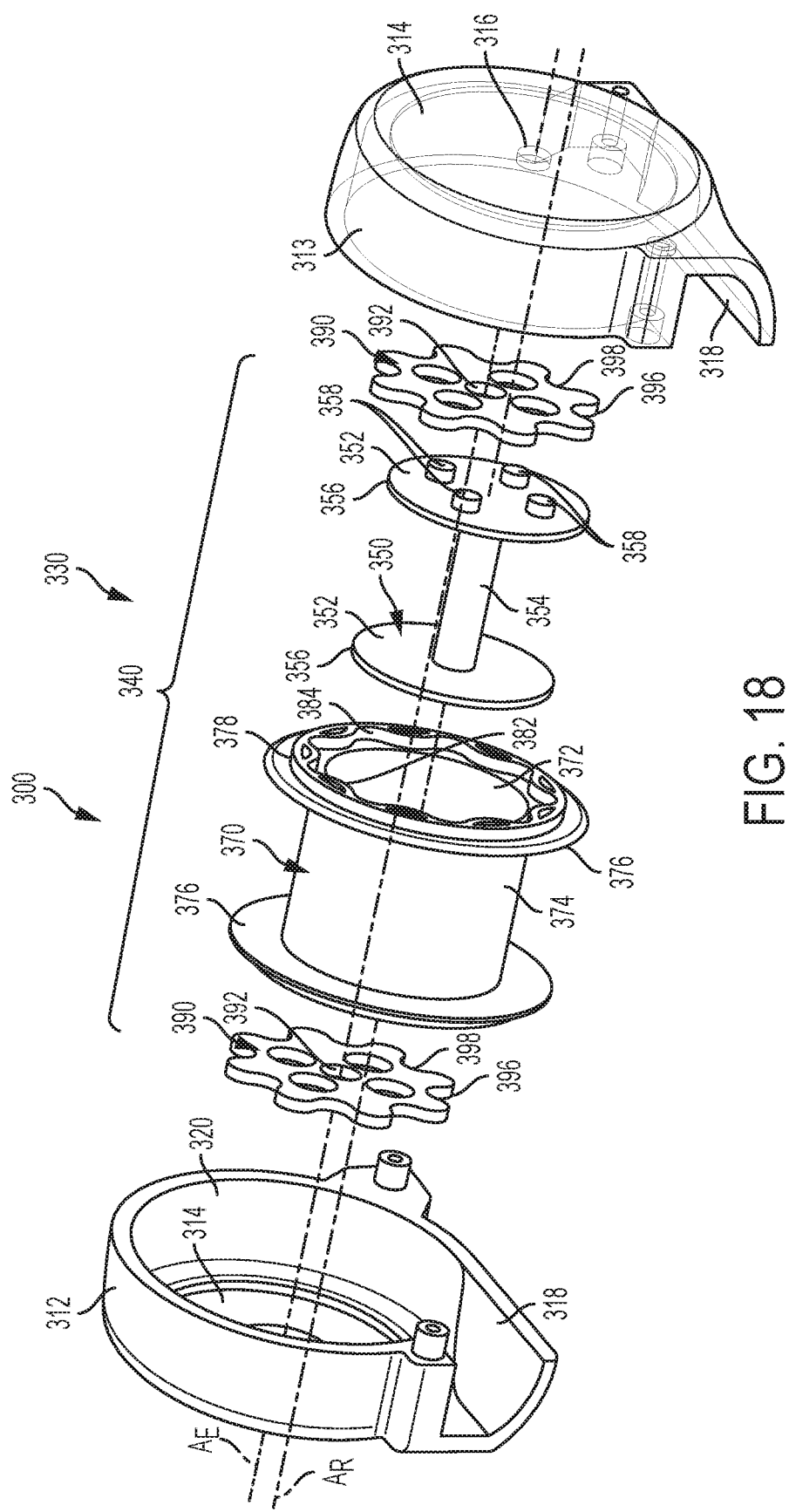
FIG. 18 is an exploded perspective view of the tape rule assembly shown in FIG. 16.
Figure 20C:
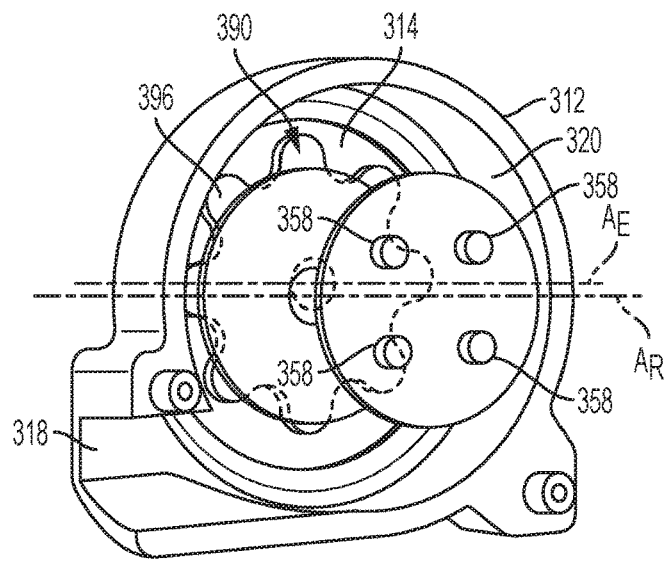
Figure 20D:
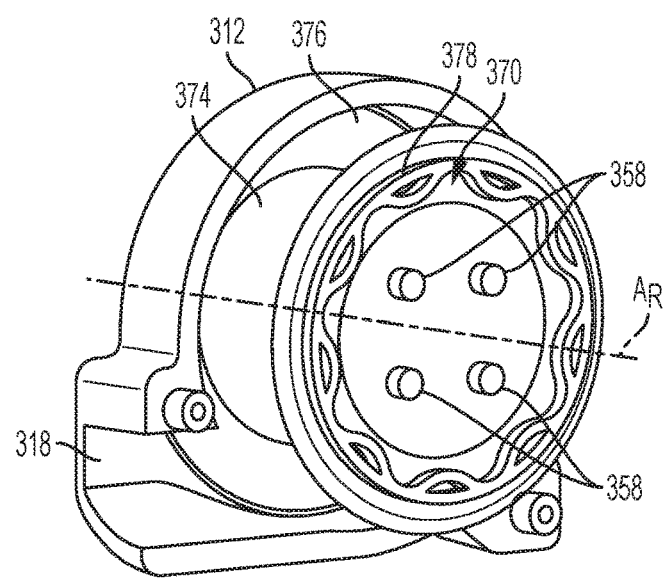
Figure 20E:
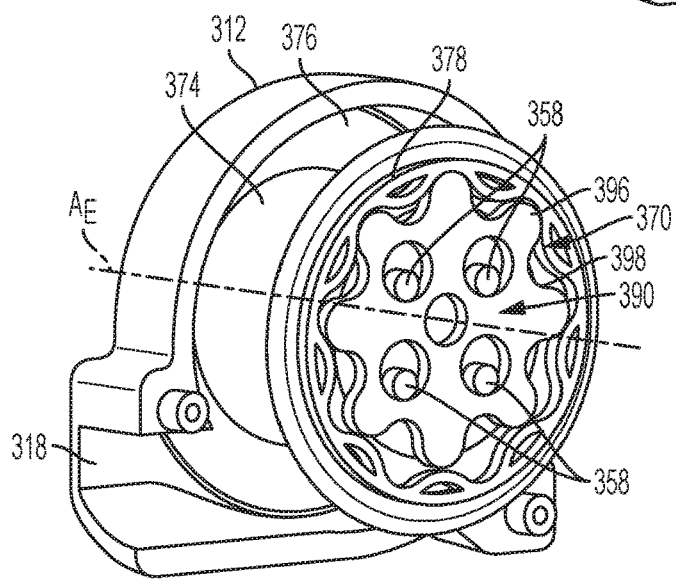

As shown in FIGS. 11 and 15, reel 270 includes a single side wall 272; in other embodiments, the reel may include two side walls. A sun gear 274 is fixedly connected to, and extends axially inwardly from, the side wall 272. In other embodiments, the reel 270 and the sun gear 274 may also be formed as a single unitary member. The reel 270 is rotatably journaled upon the hub spindle 254. A length of tape or blade 276 may be disposed on the reel 270 in a fashion similar to that discussed above with respect to the planetary drive system 132.

Figure 14:
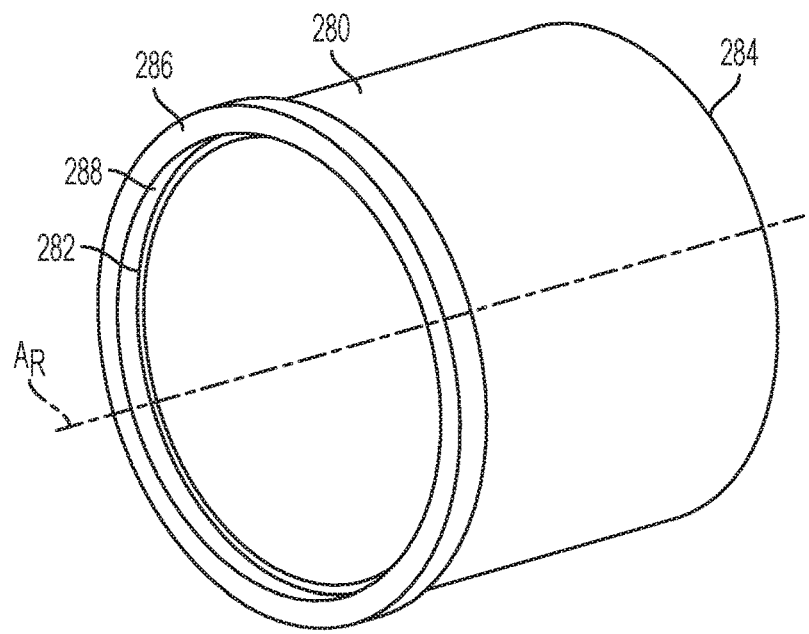
FIG. 14 is a schematic perspective detail view of a cylindrical member of the embodiment of the tape rule assembly shown in FIG. 11.

As shown in FIGS. 11 and 14, the cylindrical member 280 includes an open end 282 proximate the sun gear 274, and a closed end 284. A ring 286 extends axially outwardly from the open end 282, and includes an internal ring gear 288. The planet gears 260, sun gear 274 and internal ring gear 288 are radially aligned. The operation of the differential spring drive subassembly 230 is similar to that discussed above with respect to the differential spring drive subassembly 130. In an embodiment in which the hub 250 rotates, and the cylindrical member 280 is held stationary relative to the housing 210, extending the tape 276 from the housing 210 causes the reel 270 to rotate. This causes the sun gear 274 to rotate, and the cooperation among the sun gear, the fixed internal ring gear 288, and the rotatable planet gears 260 causes the hub 250 to rotate in a fashion similar to that discussed above with respect to the planetary drive system 132. The elements of the differential spring-drive subassembly 230 may also be configured to produce a differential drive ratio of 4/3. In other embodiments, as discussed above, additional differential drive ratios may be created as needed. In an embodiment in which the hub 250 is held stationary relative to the housing 210, and the cylindrical member 280 rotates, the same result occurs, provided the spring 264 is wound in the opposite direction.

In this embodiment, for a spring 90 inches long by 1.25 inches wide by 0.0083 inch thick, the resultant outer diameter $D_1$ of the untensioned spring 264 can be made about 1.59 inches, the blade outside diameter $D_2$ can be about 2.59 inches, and the housing outside diameter $D_3$ can be about 3.125 to about 3.250 inches (See FIG. 11).

As discussed above with respect to the tape rule assembly 100, the housing 210, hub 250, planet gears 260, reel 270 and cylindrical member 280 may be formed of the same plastic as is used in the tape rule assembly 100. In other embodiments, the components of the tape rule assembly 200 may be formed of any other suitable materials.

Still another embodiment 300 of the tape rule assembly of the present invention is shown in FIGS. 16-22E. In this embodiment, a differential spring drive subassembly 330 includes a cycloidal drive system 340 instead of a planetary drive system, as was previously discussed. A cycloidal drive in a different application is illustrated at https://en.wikipedia.org/wiki/Cycloidaldrive, and at www.youtube.com/watch?v=h1I82ose0w4. In these applications, rotation of an eccentric input shaft in one direction causes an output shaft to rotate in the opposite direction, at a different speed. However, the cycloidal drive system 340 of the present invention is radically different. It has been discovered that by considering a fixed, nonrotating offset or eccentric point on a housing member to be the "input shaft", the cycloidal drive system 340 can rotate a hub 350 so that the hub travels through an angular distance different from that of a reel 370, but in the same direction.

Accordingly, as shown in FIGS. 16-21, the tape rule assembly 300 includes a housing 310 having first and second housing members 312, 313, each of which includes a housing member side wall 314, and an offset or eccentric annular gear support member 316 lying along a gear member axis $A_E$. (This is the fixed, nonrotating offset or eccentric point on the housing members 312, 313.) The housing further includes a tape exit 318, and defines an enclosed space 320, which again is uninterrupted by such elongated members as axles, shafts or spindles. The annular gear support member 316 may be formed as a unitary body with housing members 312, 313, but in other embodiments may be attached as a separate member to the side walls 352.

Referring now to FIGS. 16 and 18-21, the cycloidal drive system 340 includes the hub 350, having an axis of rotation $A_R$ which is eccentric to the gear member axis $A_E$, and therefore eccentric to the annular gear support member 316. This relationship is shown in particular in FIGS. 18 and 19. The amount of eccentricity E may be selected to be 0.25 inch, although it will be appreciated that in other embodiments, different amounts of eccentricity may be desirable. The cycloidal drive system 340 further includes the reel 370, disposed concentrically about the hub 350 about an axis of rotation $A_R$, and a gear member 390, which is rotatably disposed on the annular gear support member 316 about the gear member axis $A_E$.

Figure 21:
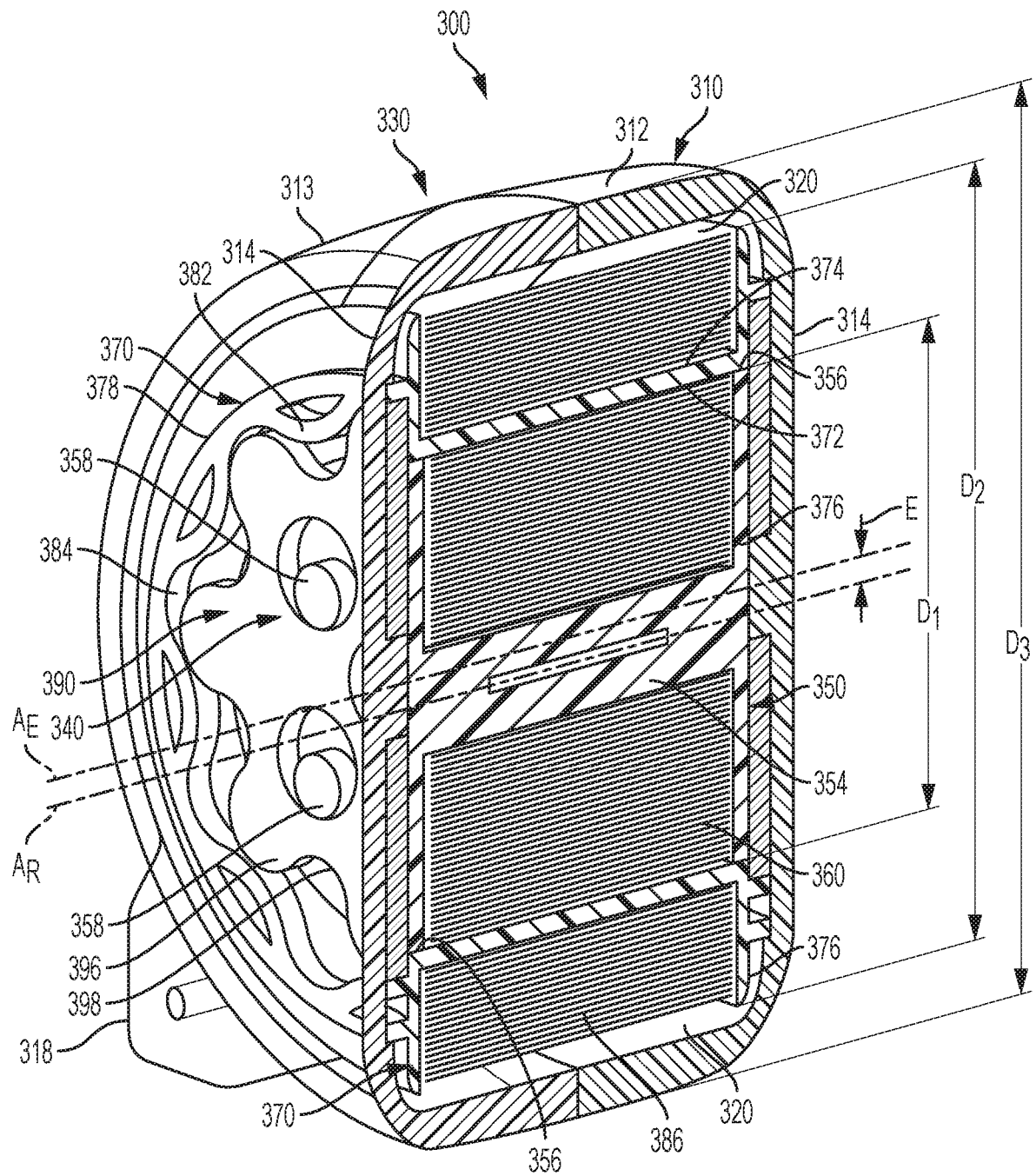
FIG. 21 is an elevational sectional view, taken along lines 21-21 of FIG. 16, and illustrating the relationship between the axis of rotation and the eccentric axis.
Figure 22A:
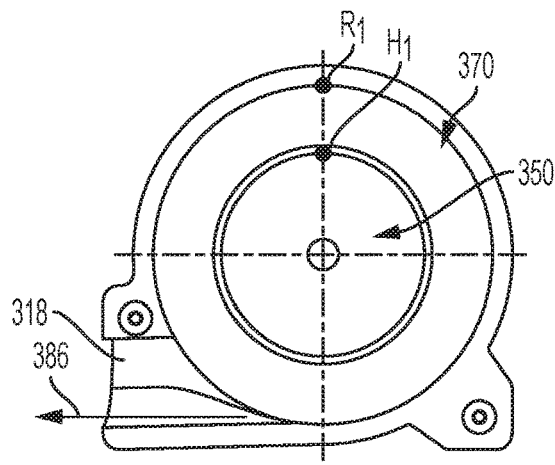
FIGS. 22A-22E are schematic elevational sectional views, similar to those of FIGS. 10A-10D, showing the relative positions of points on the reel and the hub, as tape is withdrawn from the tape rule assembly of FIG. 16.
Figure 22B:
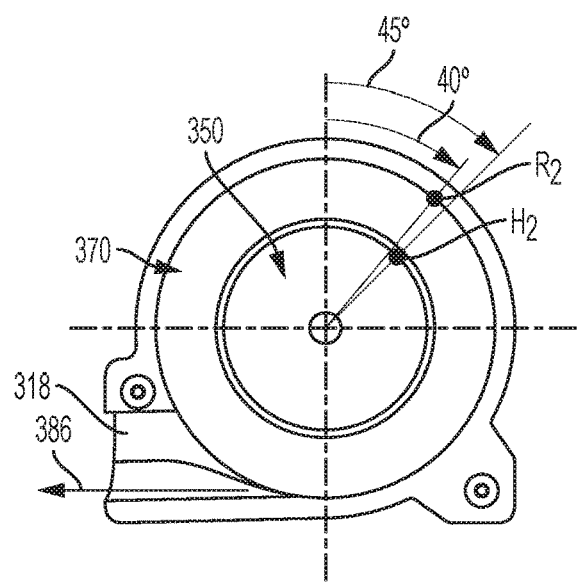
Figure 22C:
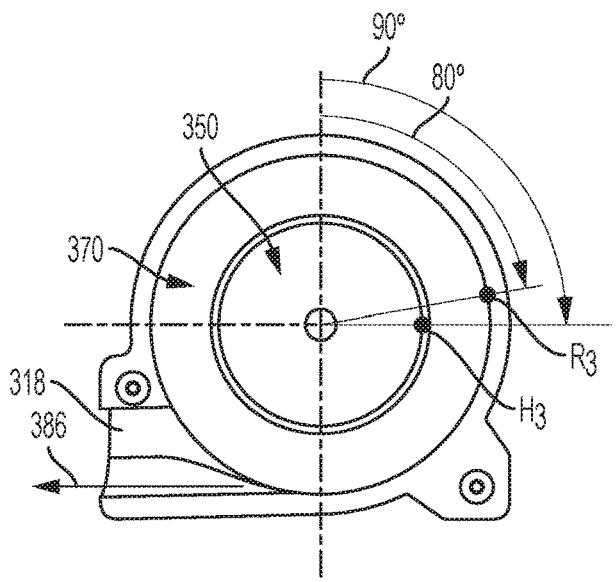
Figure 22D:
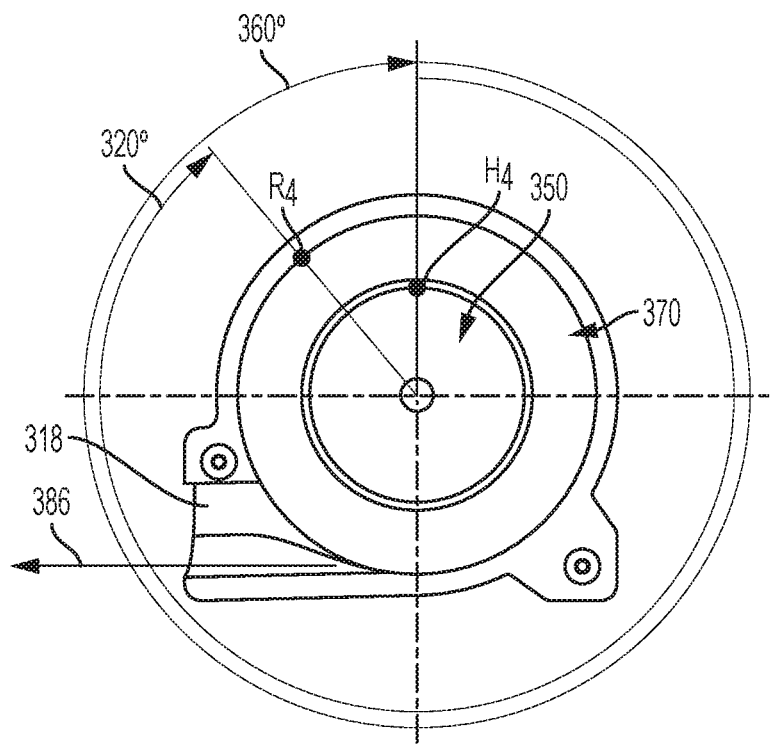
Figure 22E:
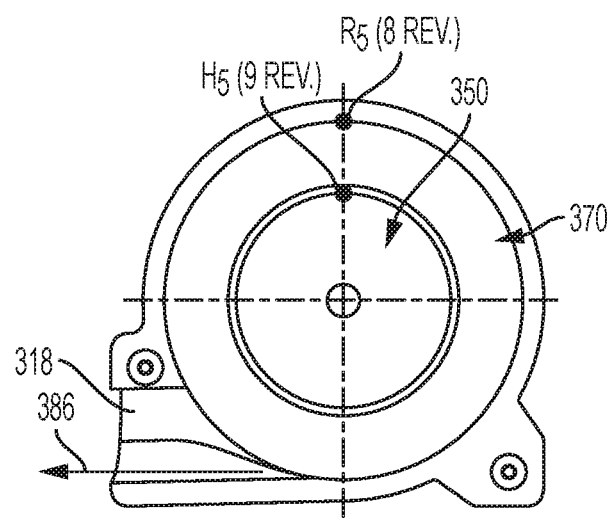

The hub 350 further includes side walls 352 mounted at opposite ends of a single, self-contained hub spindle 354. As was the case in the tape rule assembly 100, one or more hub bearing surfaces 356 may be formed on one or more external surfaces of the annular hub side walls 352, particularly if the hub is formed of plastic. Four annular gear drive members 358 extend axially outwardly from each hub side wall 352, and are spaced circumferentially equidistantly on the hub side walls. In other embodiments, there may be fewer or greater annular gear drive members 358, and the annular gear drive members 358 may include rollers. As shown in FIG. 21, a return spring 360 is wrapped around the hub spindle 354, and may be connected to the reel 370 in a fashion similar to that used in the tape rule assemblies 100, 200.

The reel 370 includes an inner cylindrical surface 372 and an outer cylindrical surface 374, and also rotates concentrically about the hub 350 about the axis of rotation $A_R$. In this embodiment, the reel inner cylindrical surface 372 is rotatably journaled directly on the hub bearing surfaces 356. The reel 370 also includes two side walls 376, each of which supports a ring 378 which extends axially outwardly from each side wall. Each ring 378 defines an internal ring gear 380, which includes a plurality of alternating radially-inwardly-directed cycloidal drive teeth 382 and cycloidal drive recesses 384, each of the drive teeth and drive recesses forming respective sets. A tape or blade 386 is supported by the reel 370, and may be connected to outer cylindrical surface 374 in a fashion similar to that discussed above with respect to tape reel assemblies 100 and 200. The tape or blade 386 may be extended from the reel 370 via the tape exit 318.

The gear member 390 defines a central bore 392, which is axially aligned with each annular gear support member 316 eccentrically formed on the housing member side walls 314. Consequently, the gear member 390 rotates about the gear member axis $A_E$ eccentrically with respect to the hub 350 and reel 370, which rotate about the axis of rotation $A_R$. The gear member 390 also defines four clearance apertures 394, which are configured to be drivingly associated with respective annular gear drive members 358. In other embodiments, there may be greater or fewer than four clearance apertures 394, corresponding to the respective numbers of annular gear drive members 358. The clearance apertures 394 are also configured to allow for the eccentric movements of the annular gear drive members 358, as the gear member 390 rotates eccentrically relative to the hub 350. The clearance apertures 394 may include about 0.25 inch clearance, and may have greater or lesser amounts of clearance in other embodiments. The gear member 390 also includes a plurality of sets of alternating driven teeth 396 and driven recesses 398, which are configured to be successively driven by respective cycloidal drive teeth 382 formed on the reel 370, such that cycloidal drive teeth 382 enter driven recesses 398, and driven teeth 396 enter cycloidal drive recesses 384, during the rotation of the reel. In the cycloidal drive system 340, nine sets of alternating cycloidal drive teeth 382 and cycloidal drive recesses 384 engage eight sets of alternating driven recesses 398 and driven teeth 396. In other embodiments, different numbers of sets of drive teeth and driven teeth may be used to effect the desired results.

The operation of the cycloidal drive system 340 can be seen in FIGS. 17A-17D, and 22A-22E. When a length of tape 386 is withdrawn from the tape exit 318, as shown by the arrows in FIGS. 22A-22E, the consequent rotation of the reel 370 about the axis of rotation $A_R$ causes the eccentrically-disposed gear member 390 to rotate about the fixed annular gear support member 316 on each housing member side wall 314. As the gear member 390 rotates, so do the four clearance apertures 394, as do their respective gear member internal annular surfaces which define such clearance apertures. The respective gear member internal annular surfaces in turn drivingly engage respective annular gear drive members 358, thereby rotating the hub 350 in the same direction as the reel 370. In short, the rotation of the reel 370 about the axis of rotation $A_R$ results in eccentric rotation of the hub 350 relative to the housing 310. (See FIGS. 17A-17D.)

Inasmuch as the reel 370 includes nine sets of cycloidal drive teeth 382, which eccentrically drive eight sets of driven teeth 396 of the gear member 390, the hub 350 rotates through nine complete revolutions for every eight complete revolutions of the reel, relative to the housing 310. Accordingly, these eight revolutions of the reel 370 result in just one wrap of the spring 360 being tightened around the hub 350. Therefore, generally speaking, the tape rule assembly 300 of the present invention requires only ⅛ the number of wraps of a conventional spring motor to return the tape or blade 386.

However, this differential drive ratio of eight to one also requires that the spring 360 be made about nine times as powerful as a conventional spring. A way to accomplish that is to increase the thickness of the spring 360, bearing in mind that the strength of the spring is roughly proportional to the cube of its thickness.

Other embodiments may use a different differential drive ratio to achieve different objectives. It will also be appreciated that the various elements of the differential spring drive subassembly 330 may be configured differently, and elements other than the "drive shaft" may be held stationary, in other embodiments. It is estimated that the present embodiment of the cycloidal drive system 340 will yield an untensioned spring outer diameter $D_1$ of about 1.59 inches, a tape or blade outer diameter $D_2$ of about 2.52 inches, and a housing outer diameter $D_3$ of about 3.125 inches (See FIG. 21).

It can thus be seen that the various embodiments of the differential spring drive subassemblies of the present invention yield a more compact tape rule assembly than was possible using conventional spring motors. In fact, the respective housings of the planetary and cycloidal differential spring-drive systems of the present invention differ primarily in whether they define molded-in sun gears or annular gear support members. Both types of housings define an enclosed space uninterrupted by spindles, shafts or axles. This makes it possible to consider both of the different types of differential spring-drive systems of the present invention to be self-contained systems that need only be "dropped into" the appropriate housing. Accordingly, a method according to the present invention of minimizing the diameter of a coil spring in a tape rule assembly involves creating an enclosed space within the housing uninterrupted by a spindle; and rotatably disposing one of a planetary differential spring-drive system and a cycloidal differential spring drive system within the enclosed space, such that rotating a reel of a respective differential spring-drive system through a first angular distance causes the hub of that spring-drive system to rotate through a second angular distance different from the first angular distance.

While the present invention has been described with respect to various embodiments of a tape rule assembly, the present invention may be further modified within the spirit and scope of this disclosure to apply to other products as well. This Application is therefore intended to cover any variations, uses, or adaptations of the present invention using its general principles. The accompanying Drawings illustrate exemplary embodiments of the invention. Alternative embodiments, examples, and modifications which would still be encompassed by the invention may be made by those skilled in the art, particularly in light of the foregoing teachings. The examples and alternative embodiments described above may be combined in a variety of ways with each other. Further, the steps and number of the various steps illustrated in the figures may be adjusted from that shown. Furthermore, this Application is intended to cover such departures from the present disclosure as come within known or customary practices in the art to which this invention pertains and which fall within the limitations of the appended claims. Those skilled in the art should now appreciate that various adaptations and modifications of the examples and alternative embodiments described above can be configured without departing from the scope and spirit of the invention. Therefore, it is to be understood that, within the scope of the appended claims, the invention may be practiced other than as specifically described herein.

What is claimed is:

1. A tape rule assembly including a length of tape and a wound spring operatively associated with the tape, comprising:
  a housing defining an enclosed space; and
  a differential spring-drive subassembly rotatably disposed in the housing enclosed space, the differential spring-drive subassembly operative to tighten the spring around a hub when the tape is extended from the housing, wherein the differential spring-drive subassembly includes a cycloidal drive system;

wherein the hub defines a single, self-contained spindle; and wherein the enclosed space is uninterrupted by any other spindle;

the differential spring-drive subassembly includes a reel supporting the length of tape, the reel and the hub being rotatable about an axis of rotation relative to the housing;

the reel is disposed in the housing concentrically about the hub; and wherein the reel and the hub are operatively associated with the housing so that, when the tape is extended from the housing, the reel rotates through a first angular distance, and the hub rotates through a second angular distance different from the first angular distance;

the housing includes a housing member defining a gear member axis eccentric to the axis of rotation; and further comprising:

a gear member rotatably disposed in the housing about the gear member axis and operatively associated with the hub and the reel;

wherein, as tape is withdrawn from the reel, the consequent rotation of the reel about the axis of rotation results in eccentric rotation of the hub relative to the housing; and wherein the hub rotates through an angular distance different from that of the reel.

2. The tape rule assembly claimed in claim 1, wherein:
the hub includes two annular side walls defining respective bearing surfaces; and
wherein a surface of the reel is rotatably journaled on the hub bearing surfaces.

3. The tape rule assembly claimed in claim 1, wherein the reel rotates through a greater angular distance than does the hub, and in the same circumferential direction as does the hub.

4. The tape rule assembly claimed in claim 1, wherein:
the reel and hub are formed of plastic;
the hub annular side walls defining respective bearing surfaces; and
wherein a surface of the reel is rotatably journaled directly on the hub bearing surfaces.

5. The tape rule assembly claimed in claim 1, wherein:
the housing includes two opposing side walls;
each housing side wall defines an annular support member extending axially inwardly;
the annular support members are axially aligned along the gear member axis;
the hub is concentrically rotatably disposed within the reel about the axis of rotation and includes two side walls, each hub side wall supporting a plurality of annular members extending axially outwardly from respective hub side walls;
the axis of rotation is parallel and eccentric to the gear member axis;
the reel includes two end faces, each reel end face includes a ring defining a plurality of radially-inwardly-directed alternating cycloidal drive teeth and drive recesses;
the gear member defines a central through-bore and is disposed within, and radially aligned with, each reel end face, each gear member rotatably supported on each housing side wall annular support member via respective gear member central through-bores, such that the axes of rotation of the gear members are eccentric relative to the axis of rotation of the hub and reel;
each gear member includes a plurality of radially-outwardly-extending driven teeth, each gear member further defining a plurality of clearance apertures operatively associated with the plurality of hub annular members;
the plurality of driven teeth of each gear member is configured to cooperate with the plurality of alternating cycloidal drive teeth and drive recesses;
the number of the plurality of alternating cycloidal drive teeth and drive recesses of the reel is greater than the number of the plurality of driven teeth of the gear member;
the reel ring is configured to cooperate with the gear member, the housing and the hub so that when the tape is extended from the housing tape exit, the reel cycloidal drive teeth rotatably drive the gear member driven teeth, and the gear member in turn eccentrically rotates the hub via engagement of respective gear member clearance apertures with the hub annular members so that the angular distance traveled by the hub is greater than the angular distance traveled by the reel; and
wherein the gear member clearance apertures are configured to accommodate the eccentric rotation of respective hub annular members relative to the gear member.

6. The tape rule assembly claimed in claim 5, wherein:
the hub rotates through a greater angular distance than does the reel;
a hub outer surface includes at least one bearing surface; and
wherein an inner surface of the reel is rotatably journaled on the at least one bearing surface.

7. The tape rule assembly claimed in claim 5, wherein:
each hub annular member includes a roller engageable with the gear member via a respective clearance aperture;
each gear member includes eight equally-circumferentially-spaced driven teeth;
each reel end face defines nine equally-circumferentially-spaced sets of alternating cycloidal drive teeth and recesses; and
wherein, for every eight revolutions of the reel, the hub makes nine revolutions, thereby resulting in one wrap of spring being tightened around the hub for each eight revolutions of the reel.

8. The tape rule assembly claimed in claim 5, wherein the reel rotates in the same circumferential direction as the hub.

9. A tape rule assembly, comprising:
a housing; and
a cycloidal differential spring-drive system having an eccentric bearing to create an eccentric cycloidal motion rotatably disposed in the housing;
wherein the cycloidal differential spring-drive system includes a reel supporting a length of tape and a hub supporting a coil of spring; and
wherein the reel is operatively associated with the housing and the hub so that when tape is extended from the housing, the reel rotates through a different angular distance than does the hub.

10. A method of minimizing the diameter of a coil of spring disposed around a hub of a tape rule assembly having a housing, comprising:
creating an enclosed space within the housing uninterrupted by a spindle; and rotatably disposing a cycloidal differential spring-drive system within the enclosed space, such that rotating a reel of the differential spring-drive system through a first angular distance causes the hub of the differential spring-drive system to rotate through a second angular distance different from the first angular distance;

wherein the cycloidal differential spring-drive system has an eccentric bearing to create an eccentric cycloidal motion.

\* \* \* \* \*